US006345729B1

(12) United States Patent
Santy, Jr.

(10) Patent No.: US 6,345,729 B1
(45) **Date of Patent: *Feb. 12, 2002**

(54) MULTIPLE FLAVOR BEVERAGE DISPENSING AIR-MIX NOZZLE

(75) Inventor: John D. Santy, Jr., Converse, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/633,384

(22) Filed: Aug. 7, 2000

Related U.S. Application Data

(63) Continuation-in-part of application No. 09/216,527, filed on Dec. 18, 1998, now Pat. No. 6,098,842, which is a continuation-in-part of application No. 09/128,241, filed on Aug. 3, 1998, now abandoned.

(51) Int. Cl.[7] .......................... G01F 11/00; B67D 5/56
(52) U.S. Cl. ..................... 222/1; 222/129.1; 222/144.5
(58) Field of Search ...................... 222/1, 129.1–129.4, 222/144.5, 145.5

(56) References Cited

U.S. PATENT DOCUMENTS 4,140,238 A * 2/1979 Dawson ...................... 222/495
4,928,854 A * 5/1990 McCann et al. ......... 222/129.1
5,203,474 A * 4/1993 Haynes .................... 222/129.1
5,415,326 A * 5/1995 Durham et al. .......... 222/129.1
5,526,959 A * 6/1996 Green ..................... 222/129.1
6,098,842 A * 8/2000 Schroeder et al. ....... 222/129.1

* cited by examiner

*Primary Examiner*—Joseph A. Kaufman
(74) *Attorney, Agent, or Firm*—Christopher L. Makay

(57) ABSTRACT

In a beverage dispensing nozzle, a cap member includes first, second, and third beverage syrup inlet ports coupled to a respective first, second, and third beverage syrup sources and a mixing fluid inlet port coupled to a mixing fluid source. A first annulus coupled with the cap member includes discharge channels, wherein the first beverage syrup inlet port communicates beverage syrup to the discharge channels for discharge from the beverage dispensing nozzle. A second annulus disposed within the first annulus and coupled with the cap member includes discharge channels, wherein the second beverage syrup inlet port communicates beverage syrup to the discharge channels for discharge from the beverage dispensing nozzle. A third annulus disposed within the second annulus and coupled with the cap member includes discharge channels, wherein the third beverage syrup inlet port communicates beverage syrup to the discharge channels for discharge from the beverage dispensing nozzle. An outer housing coupled to the cap member defines a mixing fluid channel with the first annulus, wherein the mixing fluid inlet port communicates mixing fluid to the mixing fluid channel for discharge from the beverage dispensing nozzle and mixing with exiting beverage syrup.

39 Claims, 16 Drawing Sheets

MULTIPLE FLAVOR BEVERAGE DISPENSING AIR-MIX NOZZLE

CROSS REFERENCE TO RELATED APPLICATIONS

This application is a continuation-in-part of U.S. Ser. No. 07/216,527, filed Dec. 18, 1998, now U.S. Pat. No. 6,098, 842, which was a continuation-in-part of application number 09/128,241, filed Aug. 3, 1998 and now abandoned.

BACKGROUND OF THE INVENTION

1. Field of the Invention

The present invention relates to beverage dispensing nozzles and, more particularly, but not by way of limitation, to a beverage dispensing nozzle for dispensing multiple flavored drinks from a single nozzle without intermingling flavors.

2. Description of the Related Art

Due to increases in both the number of customers served and the volume of drinks dispensed by the food and drink service industry and counter space being at a premium, standard drink dispensing nozzles fail to meet customer demand. In order to reduce space requirements and also for aesthetic reasons, it is desirable to dispense multiple flavors of drinks from a single nozzle.

In dispensing drinks from a nozzle, it is essential that the flavored syrup be intimately mixed with a mixing fluid, such as carbonated or plain water, so that the resulting drink is of uniform consistency. When the mixing fluid is carbonated water, it is essential that the carbonated water and syrup be mixed in such a manner that the carbon dioxide does not excessively escape and produce undesirable foaming.

One major problem encountered with multiple flavor nozzles is syrup carryover. It is very difficult to completely remove the residual syrup from a previously dispensed drink to avoid carryover into a subsequent, different flavored drink. This carryover causes problems with the flavor, the color, and the smell of dispensed drinks. Even small amounts of carryover syrup which cause only minor problems with odor and taste have a significant effect on the color of clear drinks, which is undesirable.

Another problem that must be addressed is proper mixing of the mixing fluid, such as carbonated or plain water, and syrup. To insure proper mixing, it is necessary to expose the maximum surface area of the syrup to the mixing fluid. If the mixing is to occur outside the nozzle, it is important that the momentum of the syrup stream be substantially equal to or less than the momentum of the mixing fluid stream.

Excessive foaming is another problem when the mixing fluid is carbonated water. To prevent excessive foaming, the carbonated water, which enters the nozzle at a high pressure, must be gently reduced to atmospheric pressure so that a minimum of carbon dioxide will escape solution. At high flow rates, out-gassing of carbon dioxide is particularly troublesome. Consequently, as the carbonated water releases carbon dioxide in both the nozzle and the cup, the released carbon dioxide escaping solution causes excessive foaming of the dispensed beverage. That excessive foaming creates a poor product because the drink is generally "flat".

Prior attempts to solve the aforementioned problems with multiple flavor nozzles have not been successful. In most instances, as in U.S. Pat. No. 4,928,854, which issued on May 29, 1990, to McCann, the syrup is delivered to the nozzle exit through a separate tubular conduit for each flavor. The syrup flows through a plurality of separate conduits to a discharge opening into a water channel for delivery to the exit end of the nozzle. The total surface area of syrup presented for contact with the mixing fluid is relatively small; thus proper mixing is difficult. The configuration also makes it difficult to eliminate syrup carryover.

SUMMARY OF THE INVENTION

In accordance with the present invention, a beverage dispensing nozzle, includes a cap member having first, second, and third beverage syrup inlet ports coupled to first, second, and third beverage syrup sources and a mixing fluid inlet port coupled to a mixing fluid source. A first annulus, a second annulus, and a third annulus are each coupled with the cap member for discharging from the beverage dispensing nozzle via discharge channels a beverage syrup delivered from a respective first, second, and third beverage syrup inlet port. An outer housing is coupled to the cap member and defines a mixing fluid channel with the first annulus for discharging from the beverage dispensing nozzle a mixing fluid delivered from the mixing fluid inlet port, which is mixed with exiting beverage syrup.

The first annulus, the second annulus, and the third annulus each include a groove therein that receives beverage syrup from a respective first, second, and third beverage syrup inlet port and delivers the beverage syrup to the discharge channels. The cap member comprises a first, second, and third beverage syrup outlet port connected with a respective first, second, and third beverage syrup inlet port and a raised portion, wherein each raised portion fits within a respective groove to couple the first annulus, the second annulus, and the third annulus to the cap member and to communicate beverage syrup to the first annulus, the second annulus, and the third annulus. The cap member further includes a plurality of mixing fluid outlet channels connected to the mixing fluid inlet port and communicating with the mixing fluid channel for circumferentially delivering mixing fluid into the mixing fluid channel.

It is, therefore, an object of the present invention to provide a beverage dispensing nozzle that dispenses a beverage syrup and mixing fluid at a high volume flow to form a dispensed beverage drink.

It is another object of the present invention to provide a beverage dispensing nozzle that eliminates stratification between the beverage syrup and mixing fluid.

It is further object of the present invention to provide a beverage dispensing nozzle that is capable of dispensing multiple flavors while preventing carryover between different flavored syrups.

Still other objects, features, and advantages of the present invention will become evident to those skilled in the art in light of the following.

DETAILED DESCRIPTION OF THE PREFERRED EMBODIMENT

Figure 1:
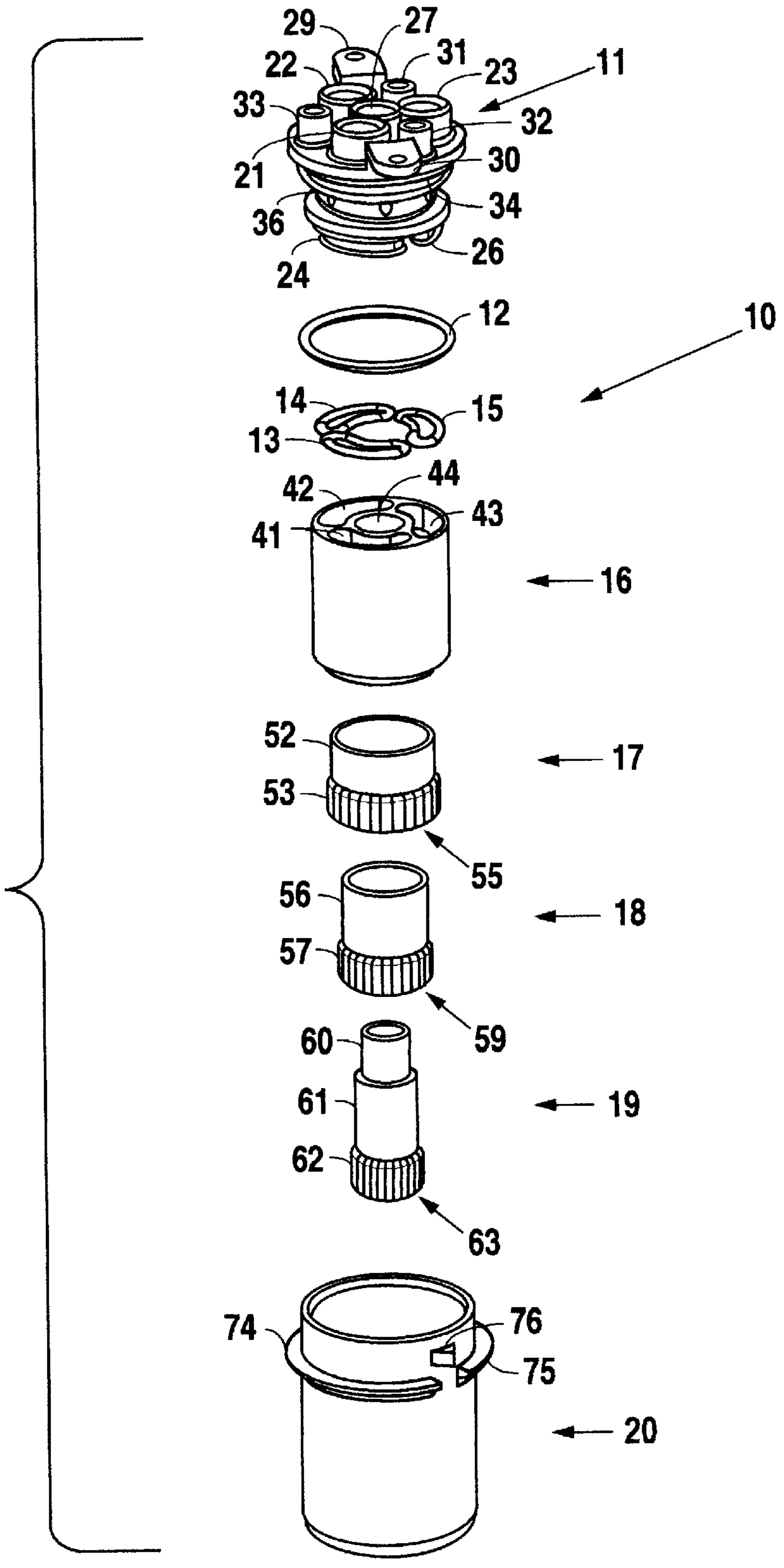
FIG. 1 is perspective view illustrating a multiple flavor beverage dispensing air-mix nozzle according to a first embodiment.

As illustrated in FIGS. 1–9, a beverage dispensing nozzle 10 includes a cap member 11, an o-ring 12, gaskets 13–15, an inner housing 16, a first or outer annulus 17, a second or intermediate annulus 18, a third or inner annulus 19, and an outer housing 20. The inner housing 16 defines a chamber 40 and includes an opening 44 into chamber 40. The inner housing 16 includes cavities 41–44 that communicate with the chamber 40 through conduits 45–47, respectively (refer to FIGS. 1 and 2). Even though the conduits 45–47 connect to separate cavities 41–43, they are concentrically spaced apart; namely, the conduit 47 is innermost, the conduit 45 is intermediate, and the conduit 46 is outermost (refer to FIGS. 7–9). The conduits 45–47 are concentrically spaced apart so that beverage syrup may enter the chamber 40 at three separate points. The interior wall of the inner housing 16 defining the chamber 40 includes stair-steps 48–51.

Figure 2:
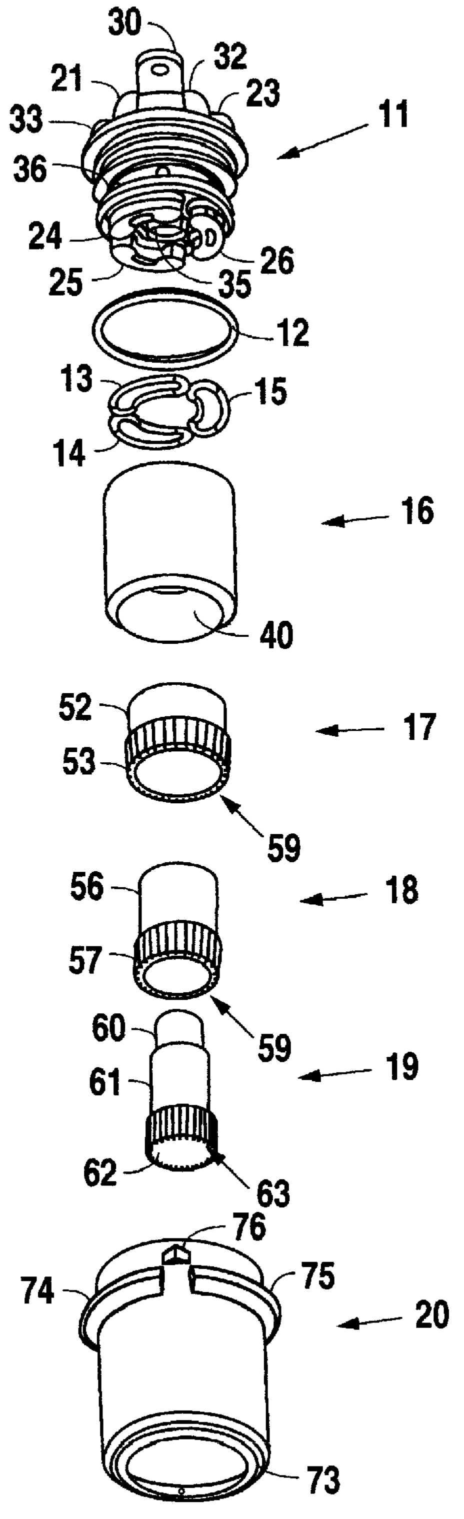
FIG. 2 is perspective view illustrating the multiple flavor beverage dispensing air-mix nozzle according to the first embodiment.
Figure 3:
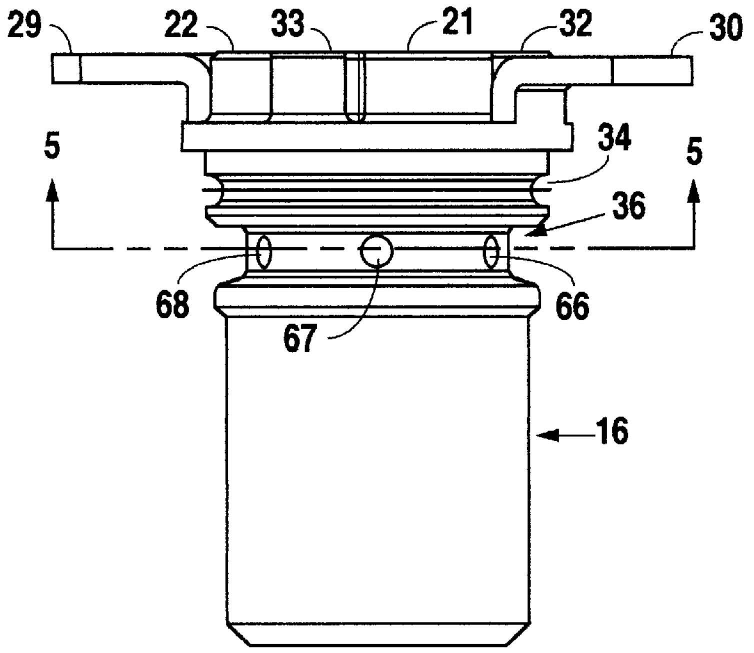
FIG. 3 is a front elevation view illustrating the multiple flavor beverage dispensing air-mix nozzle according to the first embodiment.
Figure 4:
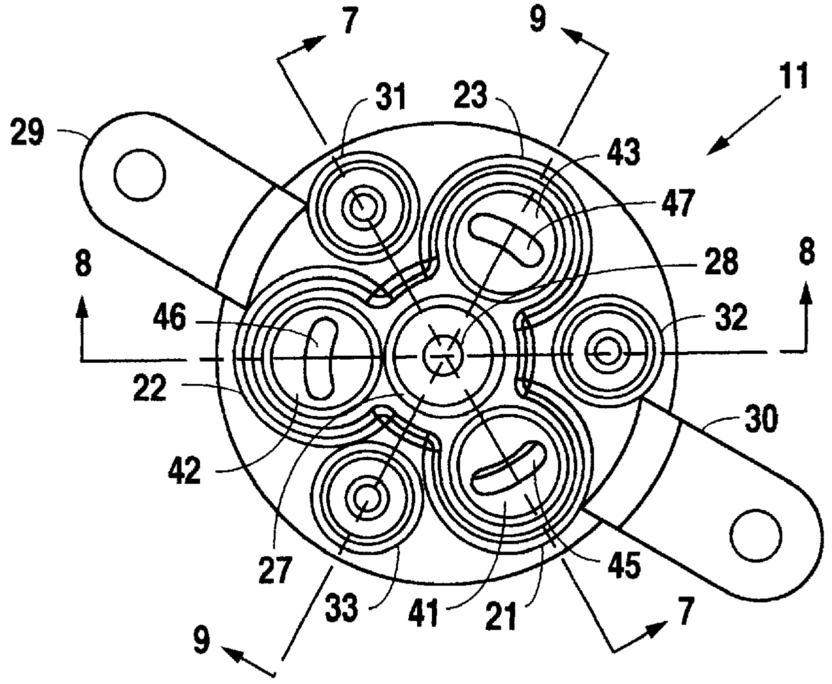
FIG. 4 is a top plan view illustrating the multiple flavor beverage dispensing air-mix nozzle according to the first preferred embodiment.
Figure 5:
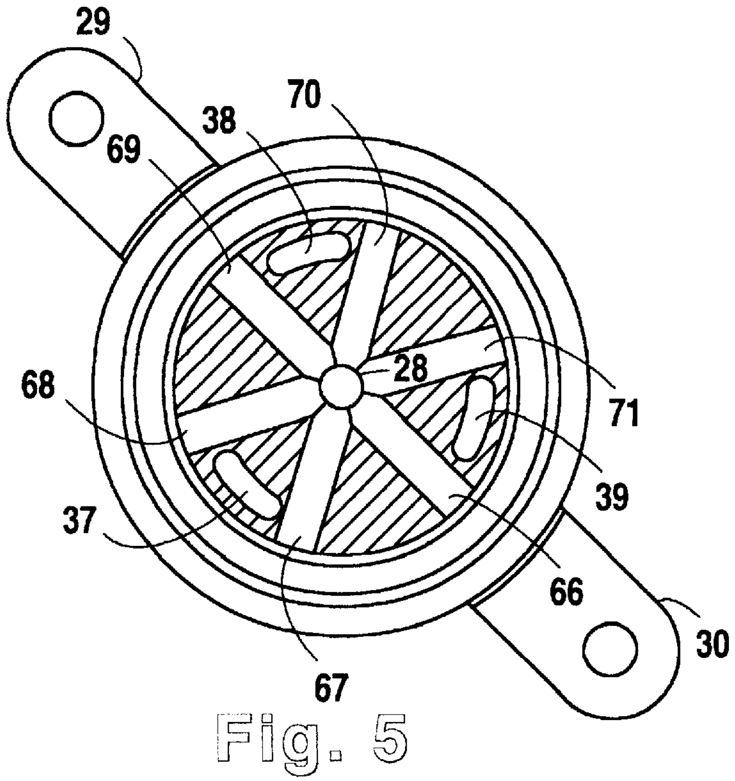
FIG. 5 is a cross-sectional view taken along lines 5,5 of FIG. 3 illustrating the multiple flavor beverage dispensing air-mix nozzle according to the first preferred embodiment.
Figure 6:
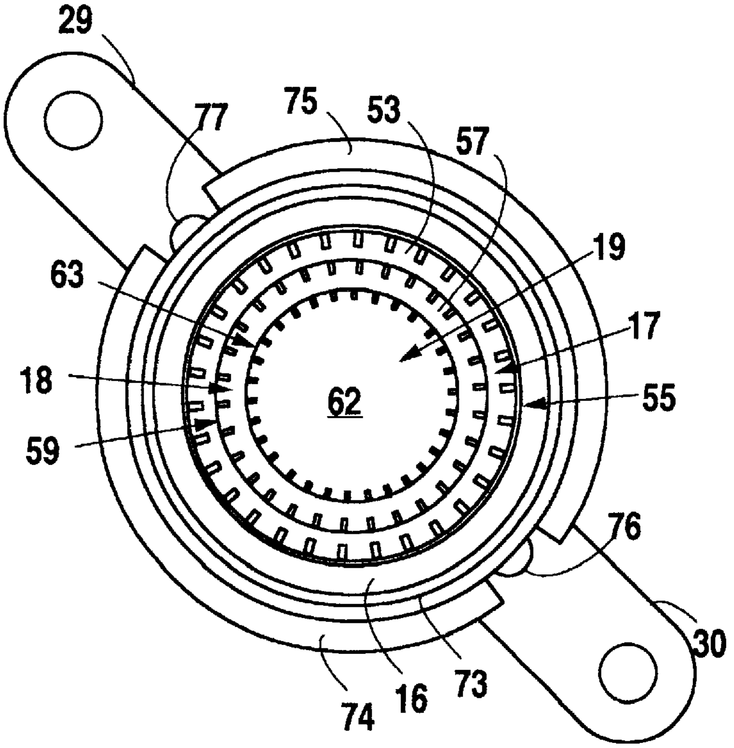
FIG. 6 is a bottom plan view illustrating the multiple flavor beverage dispensing air-mix nozzle according to the first preferred embodiment.

The first or outer annulus 17 includes an upper member 52 and a discharge member 53 (refer to FIGS. 1 and 2). The first or outer annulus 17 fits within the chamber 40 of the inner housing 16 such that a portion of the upper member 52 engages the stair step 49. That portion of the upper member 52 may press fit with the stair step 49 or, as in this first embodiment, an adhesive may be used to secure that portion of the upper member 52 with the stair step 49. The first or outer annulus 17 and the interior wall of the inner housing 16 defining the stair step 48 form an annular channel 54 that connects with the conduit 46 of the inner housing 16. The annular channel 54 insures a large volume of beverage syrup flows uniformly about the first or outer annulus 17 during discharge (refer to FIGS. 7–9). The discharge member 53 includes discharge channels 55 to aid the annular channel 54 in discharging the beverage syrup because the discharge member 53 is sized to substantially reside within the lower portion of the interior wall for the inner housing 16 (refer to FIG. 6). The discharge member 53 operates to discharge the beverage syrup in a restricted annular flow to insure uniform distribution of the beverage syrup as it exits from the beverage dispensing nozzle 10, thereby providing a maximum surface area for contact with mixing fluid also exiting from the beverage dispensing nozzle 10.

The second or intermediate annulus 18 includes an upper member 56 and a discharge member 57 (refer to FIGS. 1 and 2). The second or intermediate annulus 18 fits within the first or outer annulus 17 such that a portion of the upper member 56 engages the stair step 50. That portion of the upper member 56 may press fit with the stair step 50 or, as in this first embodiment, an adhesive may be used to secure that portion of the upper member 56 with the stair step 50. The second or intermediate annulus 17 and the interior wall of the first or outer annulus 17 form an annular channel 58 that connects with the conduit 45 of the inner housing 16. The annular channel 58 insures a large volume of beverage syrup flows uniformly about the second or intermediate annulus 18 during discharge (refer to FIGS. 7–9). The discharge member 57 includes discharge channels 59 to aid the annular channel 58 in discharging the beverage syrup because the discharge member 57 is sized to substantially reside within the lower portion of the interior wall for the first or interior annulus 17. The discharge member 57 operates to discharge the beverage syrup in a restricted annular flow to insure uniform distribution of the beverage syrup as it exits from the beverage dispensing nozzle 10, thereby providing a maximum surface area for contact with mixing fluid also exiting from the beverage dispensing nozzle 10.

The third or inner annulus 19 includes a securing member 60, an intermediate member 61 and a discharge member 62 (refer to FIGS. 1 and 2). The third or inner annulus 19 fits within the second or intermediate annulus 18 such that the securing member 60 protrudes through the opening 44 of the inner housing and engages the interior wall of the inner housing 16 defining the opening 44. The securing member 60 may press fit with the interior wall of the inner housing 16 defining the opening 44 or, as in this first embodiment, an adhesive may be used to secure the securing member 60 with the interior wall of the inner housing 16 defining the opening 44. The third or inner annulus 19 and the stair step 51 and the interior wall of the second or intermediate annulus 18 form an annular channel 64 that connects with the conduit 47 of the inner housing 16. The annular channel 64 insures a large volume of beverage syrup flows uniformly about the third or interior annulus 19 during discharge (refer to FIGS. 7–9). The discharge member 62 includes discharge channels 63 to aid the annular channel 64 in discharging the beverage syrup because the discharge member 62 is sized to substantially reside within the lower portion of the interior wall for the second or intermediate annulus 18. The discharge member 62 operates to discharge the beverage syrup in a restricted annular flow to insure uniform distribution of the beverage syrup as it exits from the beverage dispensing nozzle 10, thereby providing a maximum surface area for contact with mixing fluid also exiting from the beverage dispensing nozzle 10. Although the preferred embodiment discloses annuluses 17–19, one of ordinary skill in the art will recognize that alternative shapes, such as elliptical or polygonal, may be utilized.

The cap member 11 includes beverage syrup inlet ports 21–23 that communicate with a respective beverage syrup outlet port 24–26 via a respective connecting conduit 37–39 through the cap member 11 (refer to FIGS. 1, 2, and 7–9). The cap member 11 includes protrusion 35 to aid in the securing of the inner housing 16 to the cap member 11. The beverage syrup outlet ports 24–26 snap fit within a respective cavity 41–42 of the inner housing to secure the inner housing 16 to the cap member 11. The gaskets 13–15 fit around a respective beverage syrup outlet port 24–26 to provide a fluid seal and to assist in the securing of the inner housing 16 to the cap member 11. In addition, the securing member of the third or inner annulus 18 extending through the opening 44 of the inner housing 16 snap fits around the protrusion 35 of the cap member 11 to aid in the securing of the inner housing 16 to the cap member 11. With the inner housing 16 secured to the cap member 11, a beverage syrup path involving the beverage syrup inlet port 21; the conduit 37; the beverage syrup outlet port 24; the cavity 41; the conduit 45; and the annular channel 58, which includes the discharge channels 59, is created. A beverage syrup path involving the beverage syrup inlet port 22; the conduit 38; the beverage syrup outlet port 25; the cavity 42; the conduit 46; the annular channel 54, which includes the discharge channels 55; and one involving the beverage syrup inlet port 23; the conduit 39; the beverage syrup outlet port 26; the cavity 43; the conduit 47; the annular channel 64, which includes the discharge channels 63; are also created.

The cap member 11 includes a mixing fluid inlet port 27 that communicates with mixing fluid outlet channels 66–71 via a connecting conduit 28 through the cap member 11 (refer to FIGS. 1–3 and 6). The mixing fluid outlet channels 66–71 in this first embodiment are uniformly spaced within the cap member 11 and communicate with an annular cavity 36 defined by a portion of the cap member 11 to deliver mixing fluid along the entire circumference of the annular cavity 36. In this first embodiment, the preferred mixing fluid is carbonated water, which forms a carbonated beverage drink when combined with a beverage syrup. Nevertheless, one of ordinary skill in the art will recognize that other mixing fluids, such as plain water may be used. Furthermore, although the preferred embodiment discloses the formation of a beverage from a beverage syrup and a mixing fluid, such as carbonated or plain water, one of ordinary skill in the art will recognize that a mixing fluid, such as carbonated or plain water, may be dispensed individually from a beverage path as described above instead of a beverage syrup.

The cap member 20 includes dog ears 29 and 30 that permit the connection of the cap member 11 to a standard dispensing valve using suitable and well known means. Each of the beverage syrup inlet ports 21–23 receives a beverage syrup conduit to supply the beverage dispensing nozzle 10 with a beverage syrup. Similarly, the mixing fluid inlet port 27 receives a mixing fluid conduit to supply the beverage dispensing nozzle 10 with a mixing fluid. A fastening clip secured to each of bosses 31–33, utilizing a screw or other suitable means, maintains the beverage syrup conduits coupled with a respective beverage syrup inlet port 21–23 and the mixing fluid conduit coupled with the mixing fluid inlet port 27. The cap member 11 includes a groove 34 for receiving the o-ring 12 therein.

The outer housing 20 snap fits over the cap member 11, including the o-ring 12 which provides a fluid seal and assists in the securing of the outer housing 16 to the cap member 11. The outer housing 20 includes flanges 74 and 75 and tabs 76 and 77 to mount the outer housing 20 to a standard dispensing valve in well known manner. The outer housing 20 further includes an inwardly extending lip portion 73 at its exit end. The interior wall of the outer housing 20 in combination with the portion of the cap member 11 defining the annular cavity 36 and the exterior wall of the inner housing define an annular channel 72. With the outer housing 20 secured to the cap member 11, a mixing fluid path involving the mixing fluid inlet port 27, the conduit 28, the mixing fluid outlet channels 66–71, and the annular channel 72 is created. Although the preferred embodiment contemplates the dispensing of a mixing fluid, such as carbonated or plain water, in combination with a beverage syrup, one of ordinary skill in the art will recognize that the mixing fluid may be dispensed separately to provide the mixing fluid by itself.

Figure 8:
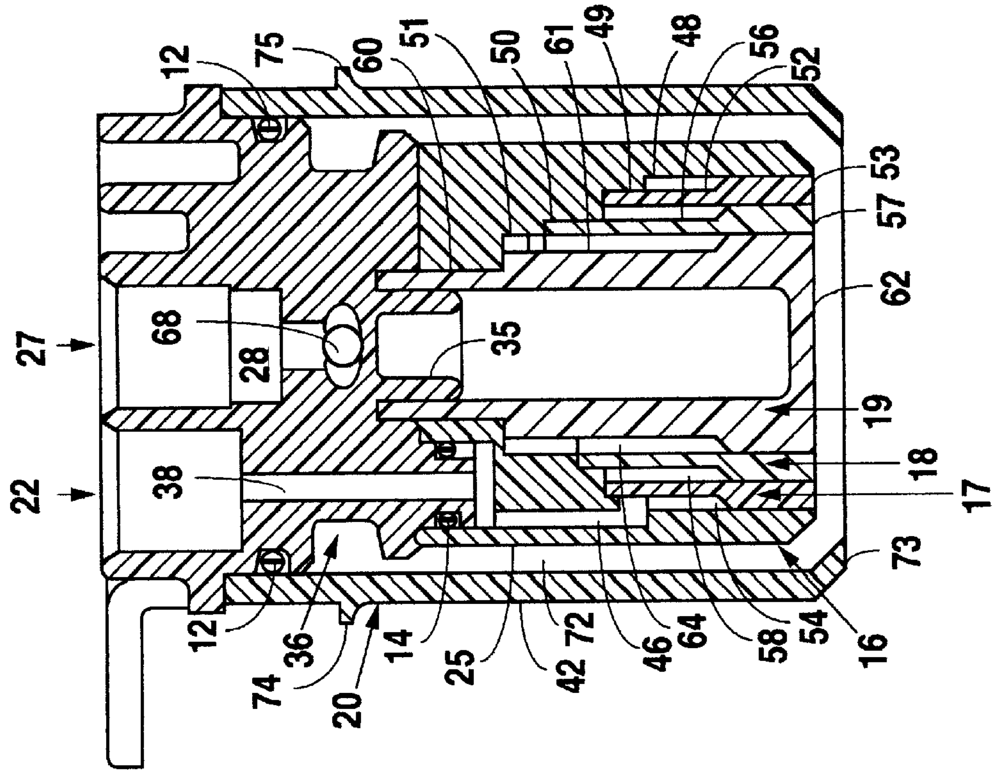
FIG. 8 is a cross-sectional view taken along lines 8,8 of FIG. 4 illustrating the multiple flavor beverage dispensing air-mix nozzle according to the first preferred embodiment.
Figure 7:
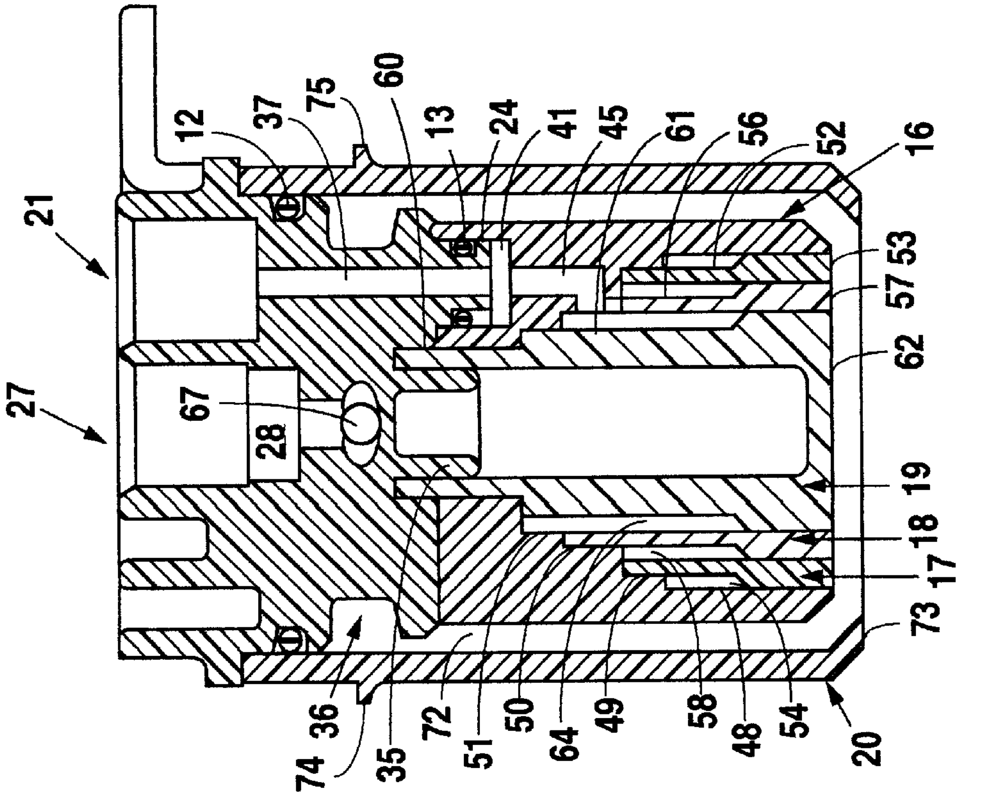
FIG. 7 is a cross-sectional view taken along lines 7,7 of FIG. 4 illustrating the multiple flavor beverage dispensing air-mix nozzle according to the first preferred embodiment.
Figure 9:
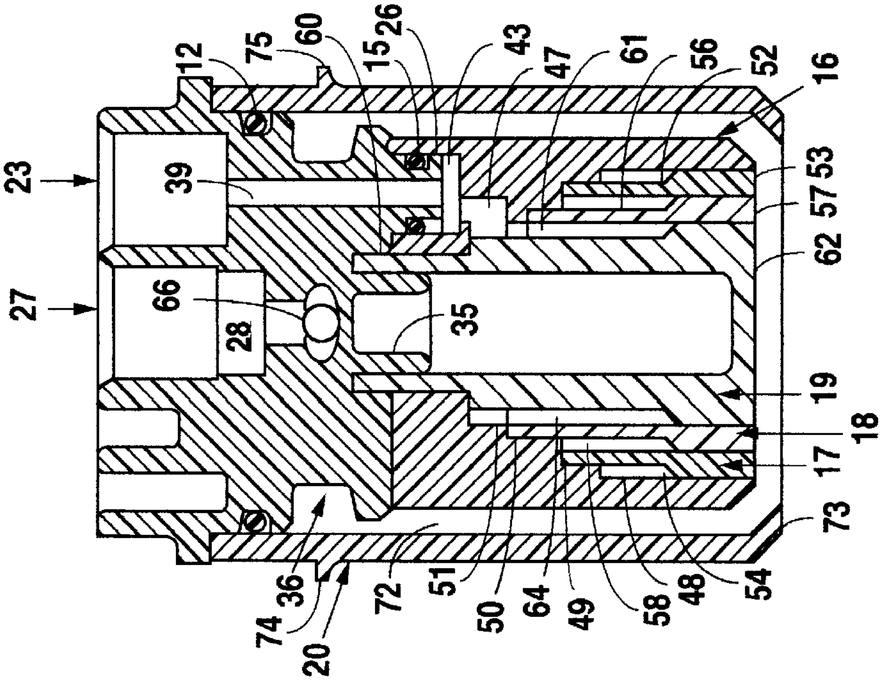
FIG. 9 is a cross-sectional view taken along lines 9,9 of FIG. 4 illustrating the multiple flavor beverage dispensing air-mix nozzle according to the first preferred embodiment.

In operation, mixing fluid enters the beverage dispensing nozzle 10 through the mixing fluid inlet port 27 and travels through the conduit 28 to the mixing fluid outlet channels 66–71 for delivery into the annular cavity 36 (refer to FIGS. 7–9). The annular cavity 36 receives a large volume of mixing fluid to insure the annular channel 72 remains full for uniform flow around the annular channel 72 as the mixing fluid flows downwardly through the annular channel 72 to the discharge end of the annular channel 72. In the preferred embodiments, the discharge end of the annular channel 72 may be partially closed to increase the momentum of the mixing fluid exiting the annular channel 72 to maintain a uniform distribution of mixing fluid exiting around the entire circumference of the annular channel 72. The inwardly extending lip portion 73 of the outer housing 20 directs the mixing fluid inwardly toward a beverage syrup stream exiting from one of discharge members 53, 57, and 62. The inward directing of the mixing fluid provides for intimate mixing as well as a means for washing the discharge end of the annular channel 72 to prevent syrup carryover.

The beverage syrup inlet ports 21–23 each receive a different flavor of beverage syrup, which is delivered through a conduit by a beverage syrup source (not shown). Each beverage syrup travels through its particular flow path for discharge from the beverage dispensing nozzle 10 as previously described (refer to FIGS. 7–9). Illustratively, a beverage syrup delivered to the beverage syrup inlet port 21 flows through the conduit 37, the beverage syrup outlet port 24, the cavity 41, the conduit 45, the annular channel 58, and the discharge channels 59 prior to discharge from the beverage dispensing nozzle 10. The annular channels 54, 58, and 64 provide a large volume of beverage syrup around each of a respective first or outer, second or intermediate, and third or inner annulus for discharge through one of the discharge members 53, 57, and 62. The discharge members 53, 57, and 62 restrict the flow of beverage syrup to insure uniform distribution of the beverage syrup as it exits from the beverage dispensing nozzle 10, thus insuring a maximum surface area for contact with the mixing fluid exiting from the annular channel 72. Although only one beverage syrup is typically dispensed at a time, it should be understood that more than one beverage syrup may be discharged from the beverage dispensing nozzle 10 at a time to provide a mix of flavors.

An important feature of the beverage dispensing nozzle 10 is the annular discharge of a beverage syrup, whereby the annularly discharged mixing fluid contacts the beverage syrup in mid-air below the dispensing nozzle 10. The annular discharge shape of the beverage syrup and the mixing fluid significantly increases the contact surface area between the two streams, resulting in more effective mixing. Furthermore, the mixture of the beverage syrup and the mixing fluid outside the beverage dispensing nozzle 10 eliminates the sanitary considerations that occur with a mixing chamber interior to the nozzle; namely, the unsanitary build up of bacteria on the interior of the mixing chamber, which is exacerbated due to the stickiness of the beverage syrup. Although three separate beverage syrup sources with three annuluses have been described, one of ordinary skill in the art will recognize that any number of beverage syrup sources and annuluses could be provided, including a single beverage syrup source and annulus. In addition, the single stream of mixing fluid exiting from the annular channel 72 may be separated into two or more streams.

Figure 10:
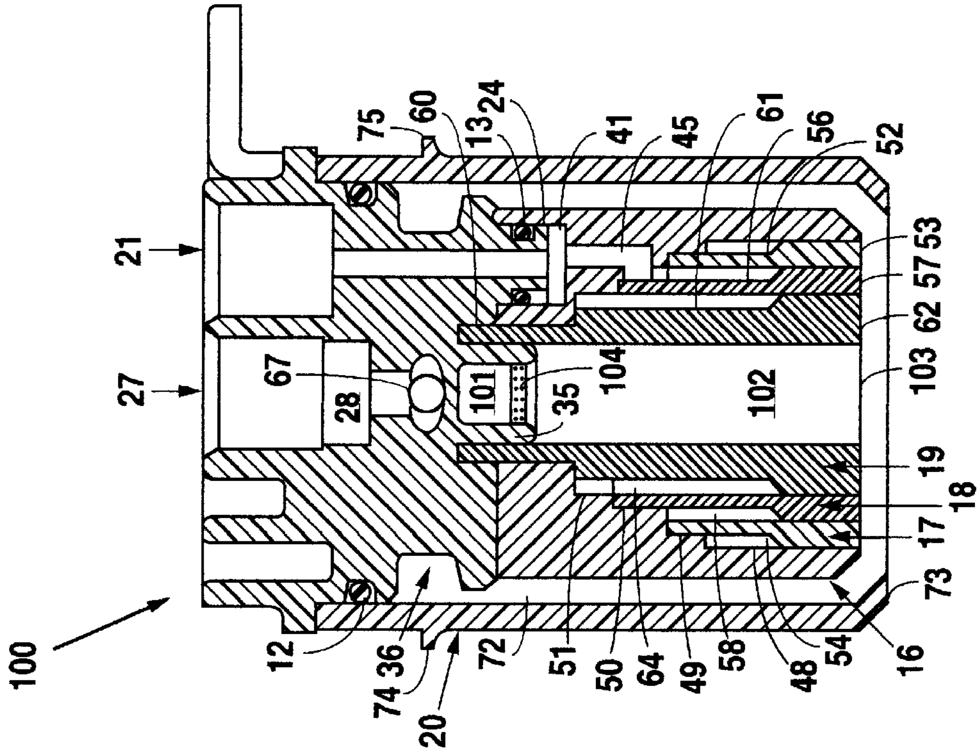
FIG. 10 is a cross-sectional view taken along lines 7,7 of FIG. 4 illustrating a multiple flavor beverage dispensing air-mix nozzle according to a second embodiment.
Figure 12:
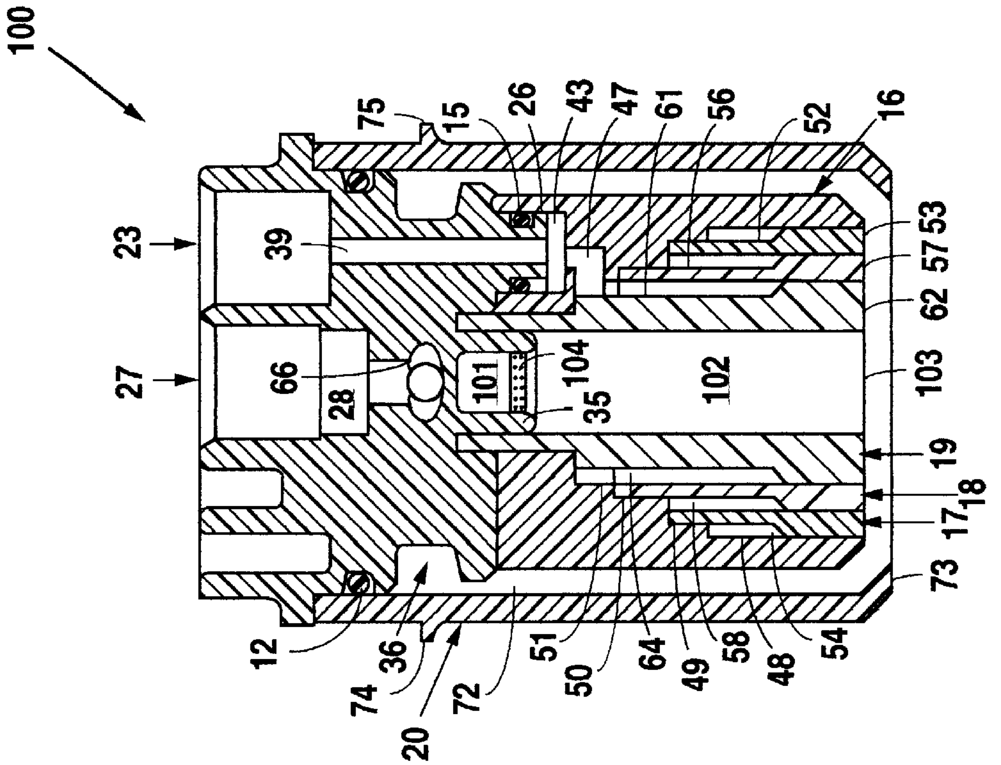
FIG. 12 is a cross-sectional view taken along lines 9,9 of FIG. 4 illustrating the multiple flavor beverage dispensing air-mix nozzle according to the second embodiment.
Figure 11:
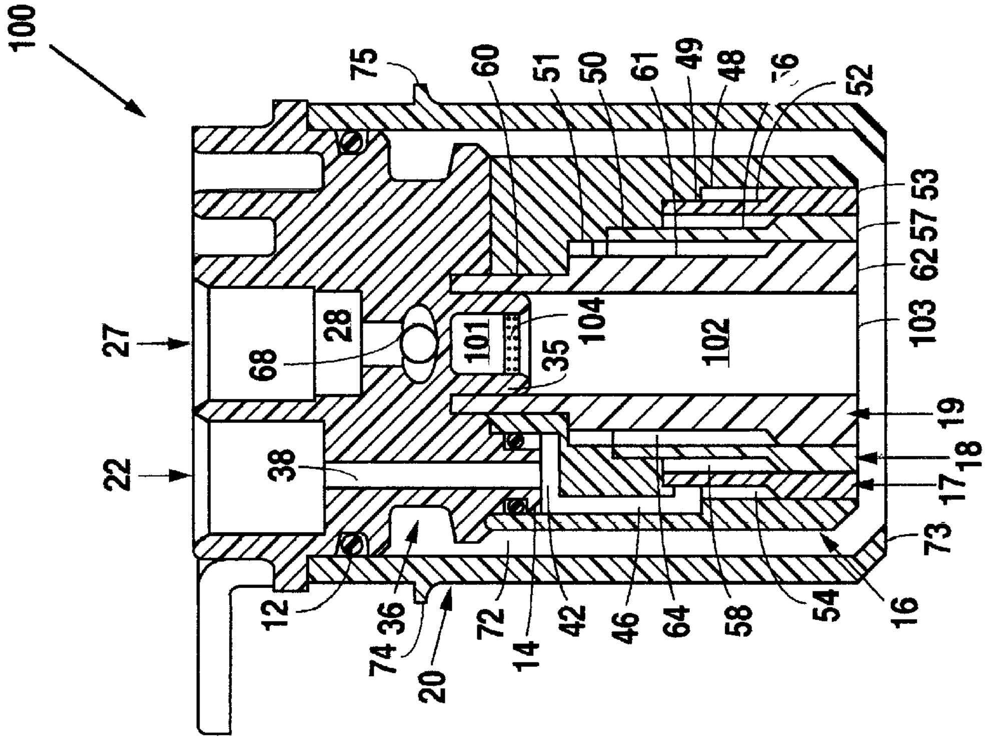
FIG. 11 is a cross-sectional view taken along lines 8,8 of FIG. 4 illustrating the multiple flavor beverage dispensing air-mix nozzle according to the second embodiment.

As illustrated in FIGS. 10–12, a second embodiment of the beverage dispensing nozzle 100 is virtually identical in configuration and operation to the first embodiment of the beverage dispensing nozzle 10. Consequently, components for the beverage dispensing nozzle 100 of like configuration and operation to components of the beverage dispensing nozzle 10 have been referenced with like numerals. The beverage dispensing nozzle 100 is configured and operates as the beverage dispensing nozzle 10, except the beverage dispensing nozzle 100 includes a conduit 101 coupled to the conduit 28 to communicate mixing fluid into a center conduit 102 of the third or inner annulus 19. In addition, the third or inner annulus 18 includes an outlet 103 for discharging the mixing fluid interior to a discharged beverage syrup stream. The conduit 28 therefore not only delivers mixing fluid to the mixing fluid outlet channels 66–71 but also to the conduit 101 for delivery to the center conduit 102. The center conduit 102 delivers the mixing fluid through the center of the beverage dispensing nozzle 100, where it exits inside a beverage syrup stream to enhance mixing of the mixing fluid and beverage syrup. The beverage dispensing nozzle 100 is particularly desirable for use in dispensing single flavor beverage drinks and for use with large volume beverage dispensing nozzles. A diffuser 104 may be positioned within the conduit 101 to direct the mixing fluid onto the sides of the center conduit 102 to prevent a single stream exiting the outlet 103, thereby improving surface contact between the mixing fluid and beverage syrup.

Figure 13:
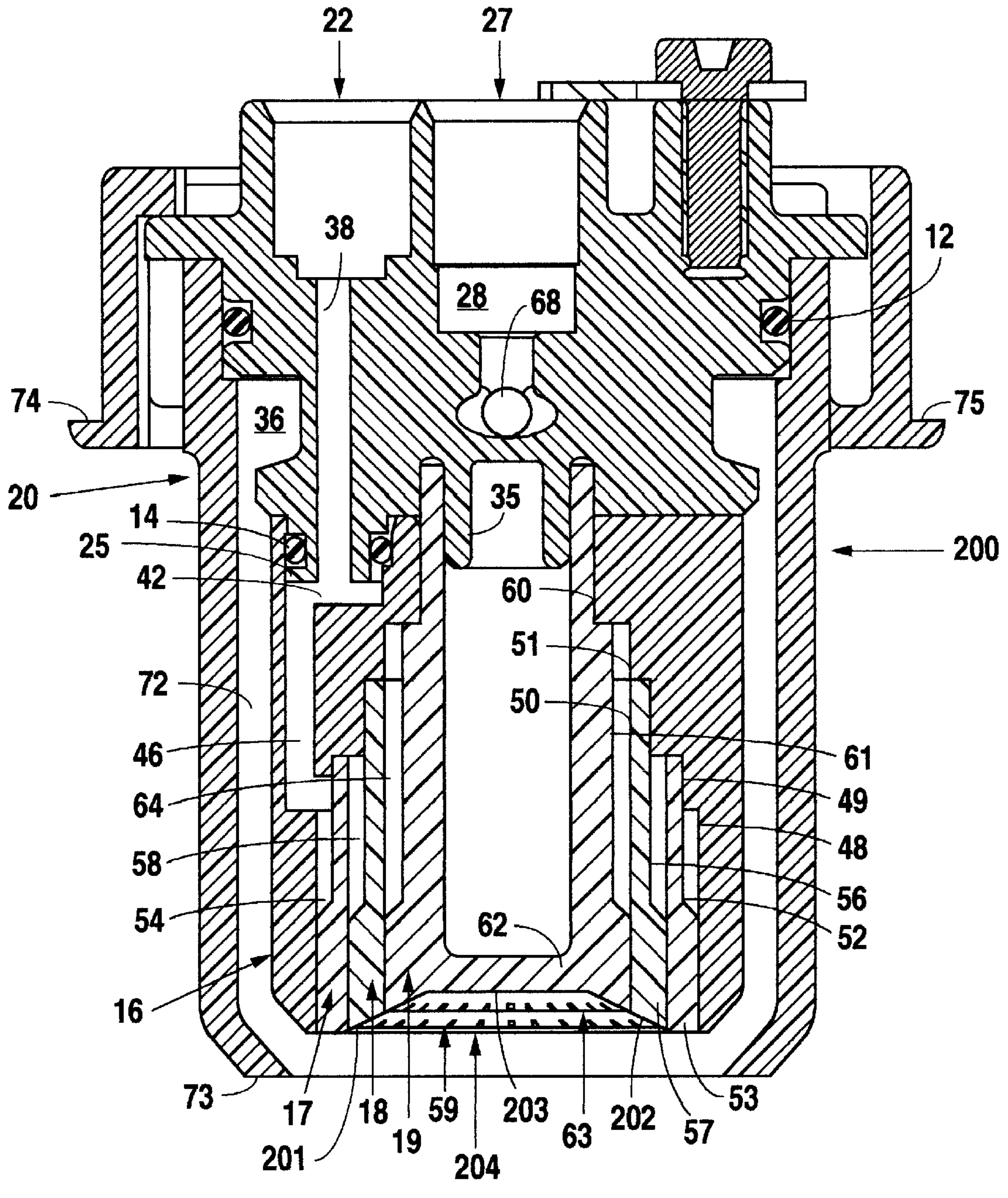
FIG. 13 is a cross-sectional view illustrating a multiple flavor beverage dispensing air-mix nozzle according to a third embodiment.

As illustrated in FIG. 13, a third embodiment of the beverage dispensing nozzle 200 is virtually identical in configuration and operation to the first embodiment of the beverage dispensing nozzle 10. Consequently, components for the beverage dispensing nozzle 200 of like configuration and operation to components of the beverage dispensing nozzle 10 have been referenced with like numerals. The beverage dispensing nozzle 200 is configured and operates as the beverage dispensing nozzle 10, except, in the beverage dispensing nozzle 200, the outlet end of the first or outer annulus 17 includes a conical cut-out portion 201, the outlet end of the second or intermediate annulus 18 includes a conical cut-out portion 202, and the outlet end of the third or inner annulus 19 includes a conical cut-out portion 203. When the first or outer annulus 17, the second or intermediate annulus 18, and the third or inner annulus 19 are secured within the inner housing 16, the conical cut-out portions 201, 202, and 203 define a reverse conical beverage syrup outlet 204 that aids in preventing beverage syrup carryover by facilitating the formation of a low pressure region at the beverage syrup outlet 204. During the dispensing of a beverage syrup and a mixing fluid to form a beverage, the low pressure region permits the flow of mixing fluid over the beverage syrup outlet 204, thereby washing the beverage syrup outlet 204 to remove any carryover beverage syrup.

Figure 14:
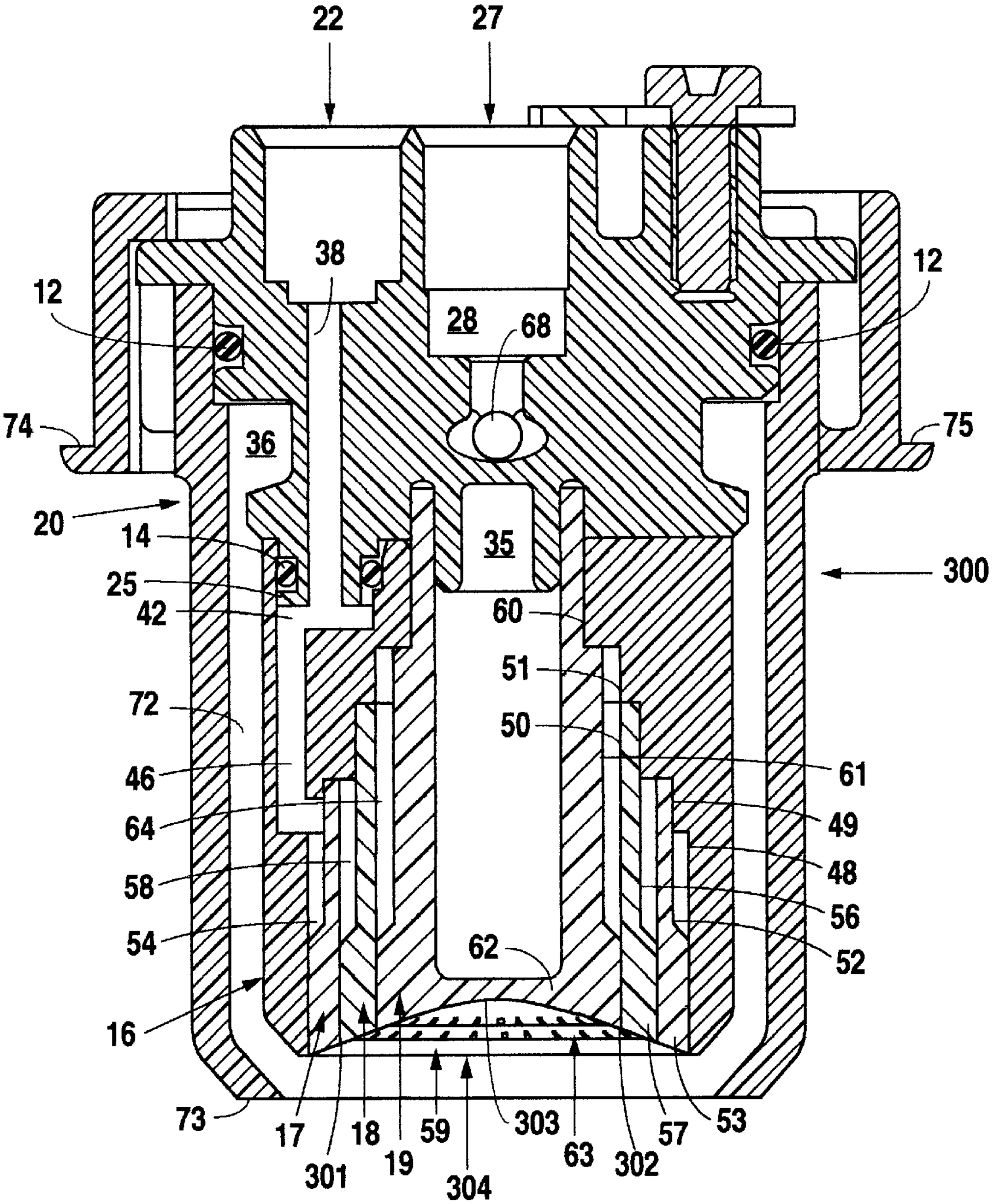
FIG. 14 is a cross-sectional view illustrating a multiple flavor beverage dispensing air-mix nozzle according to a fourth embodiment.

As illustrated in FIG. 14, a fourth embodiment of the beverage dispensing nozzle 300 is virtually identical in configuration and operation to the first embodiment of the beverage dispensing nozzle 10. Consequently, components for the beverage dispensing nozzle 300 of like configuration and operation to components of the beverage dispensing nozzle 10 have been referenced with like numerals. The beverage dispensing nozzle 300 is configured and operates as the beverage dispensing nozzle 10, except, in the beverage dispensing nozzle 300, the outlet end of the first or outer annulus 17 includes a concave cut-out portion 301, the outlet end of the second or intermediate annulus 18 includes a concave cut-out portion 302, and the outlet end of the third or inner annulus 19 includes a concave cut-out portion 303. When the first or outer annulus 17, the second or intermediate annulus 18, and the third or inner annulus 19 are secured within the inner housing 16, the concave cut-out portions 301, 302, and 303 define a concave beverage syrup nozzle outlet 304 that aids in preventing beverage syrup carryover by facilitating the formation of a low pressure region at the beverage syrup outlet 304. During the dispensing of a beverage syrup and a mixing fluid to form a beverage, the low pressure region permits the flow of mixing fluid over the beverage syrup outlet 304, thereby washing the beverage syrup outlet 304 to remove any carryover beverage syrup.

Figure 15:
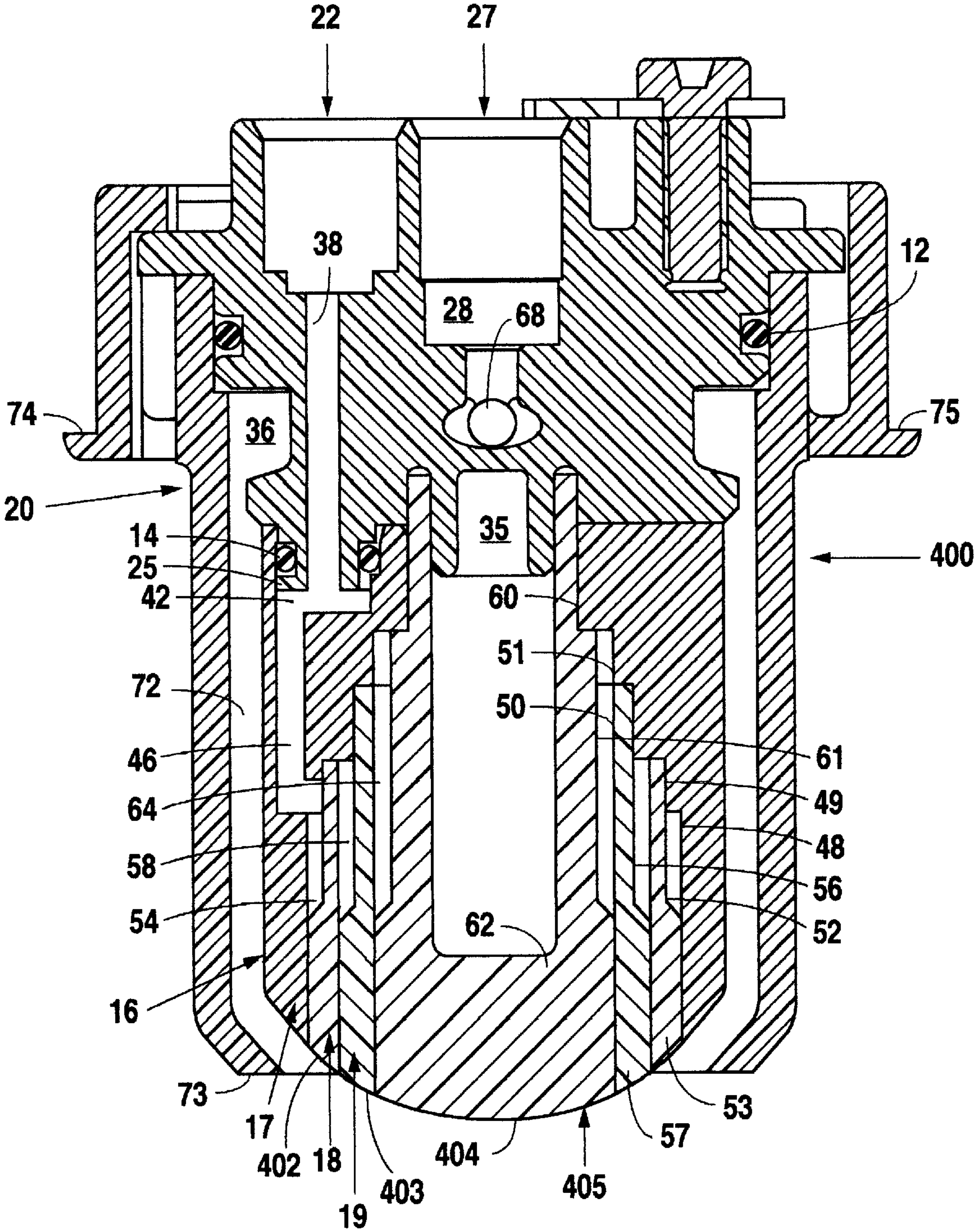
FIG. 15 is a cross-sectional view illustrating a multiple flavor beverage dispensing air-mix nozzle according to a fifth embodiment.

As illustrated in FIG. 15, a fifth embodiment of the beverage dispensing nozzle 400 is virtually identical in configuration and operation to the first embodiment of the beverage dispensing nozzle 10. Consequently, components for the beverage dispensing nozzle 400 of like configuration and operation to components of the beverage dispensing nozzle 10 have been referenced with like numerals. The beverage dispensing nozzle 400 is configured and operates as the beverage dispensing nozzle 10, except, in the beverage dispensing nozzle 400, the outlet end of the first or outer annulus 17 includes a convex protrusion 402, the outlet end of the second or intermediate annulus 18 includes a convex protrusion 403, and the outlet end of the third or inner annulus 19 includes a convex protrusion 404. When the first or outer annulus 17, the second or intermediate annulus 18, and the third or inner annulus 19 are secured within the inner housing 16, the convex protrusions 402, 403, and 404 define a convex beverage syrup nozzle outlet 405 that aids in preventing beverage syrup carryover because the rounded convex shape permits dispensed beverage syrup to flow to the lower portion of the beverage syrup nozzle outlet 405 where it is rinsed off by the flow of the dispensed mixing fluid.

Figure 16:
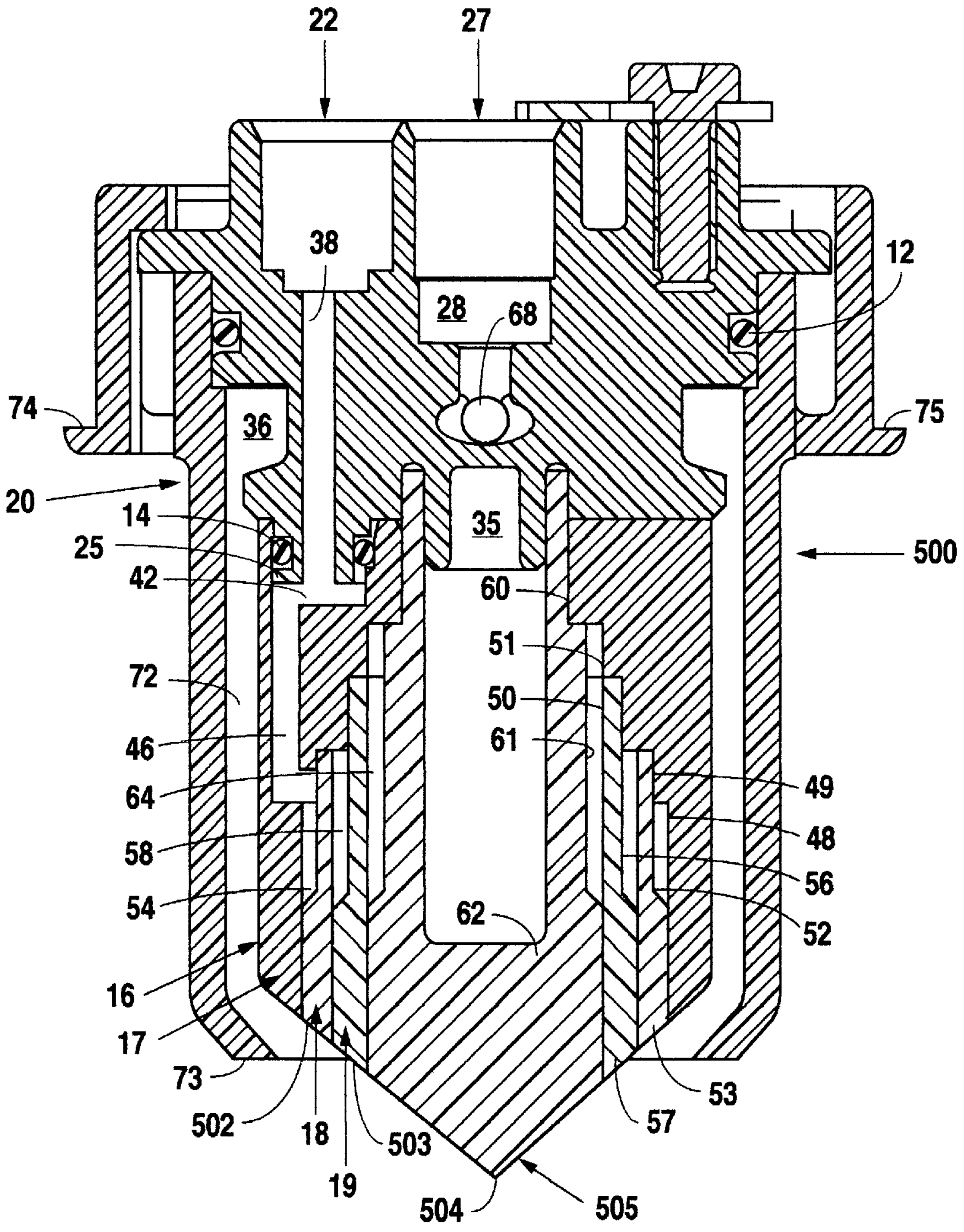
FIG. 16 is a cross-sectional view illustrating a multiple flavor beverage dispensing air-mix nozzle according to a sixth embodiment.

As illustrated in FIG. 16, a sixth embodiment of the beverage dispensing nozzle 500 is virtually identical in configuration and operation to the first embodiment of the beverage dispensing nozzle 10. Consequently, components for the beverage dispensing nozzle 500 of like configuration and operation to components of the beverage dispensing nozzle 10 have been referenced with like numerals. The beverage dispensing nozzle 500 is configured and operates as the beverage dispensing nozzle 10, except, in the beverage dispensing nozzle 500, the outlet end of the first or outer annulus 17 includes a downward sloping edge 502, the outlet end of the second or intermediate annulus 18 includes a downward sloping edge 503, and the outlet end of the third or inner annulus 19 includes a conical edge 504. When the first or outer annulus 17, the second or intermediate annulus 18, and the third or inner annulus 19 are secured within the inner housing 16, the downward sloping edges 502 and 503 and the conical edge 504 define a conical beverage syrup nozzle outlet 505 that aids in preventing beverage syrup carryover because the conical shape permits dispensed beverage syrup to flow to the lower portion of the beverage syrup nozzle outlet 505 where it is rinsed off by the flow of the dispensed mixing fluid.

Figure 17:
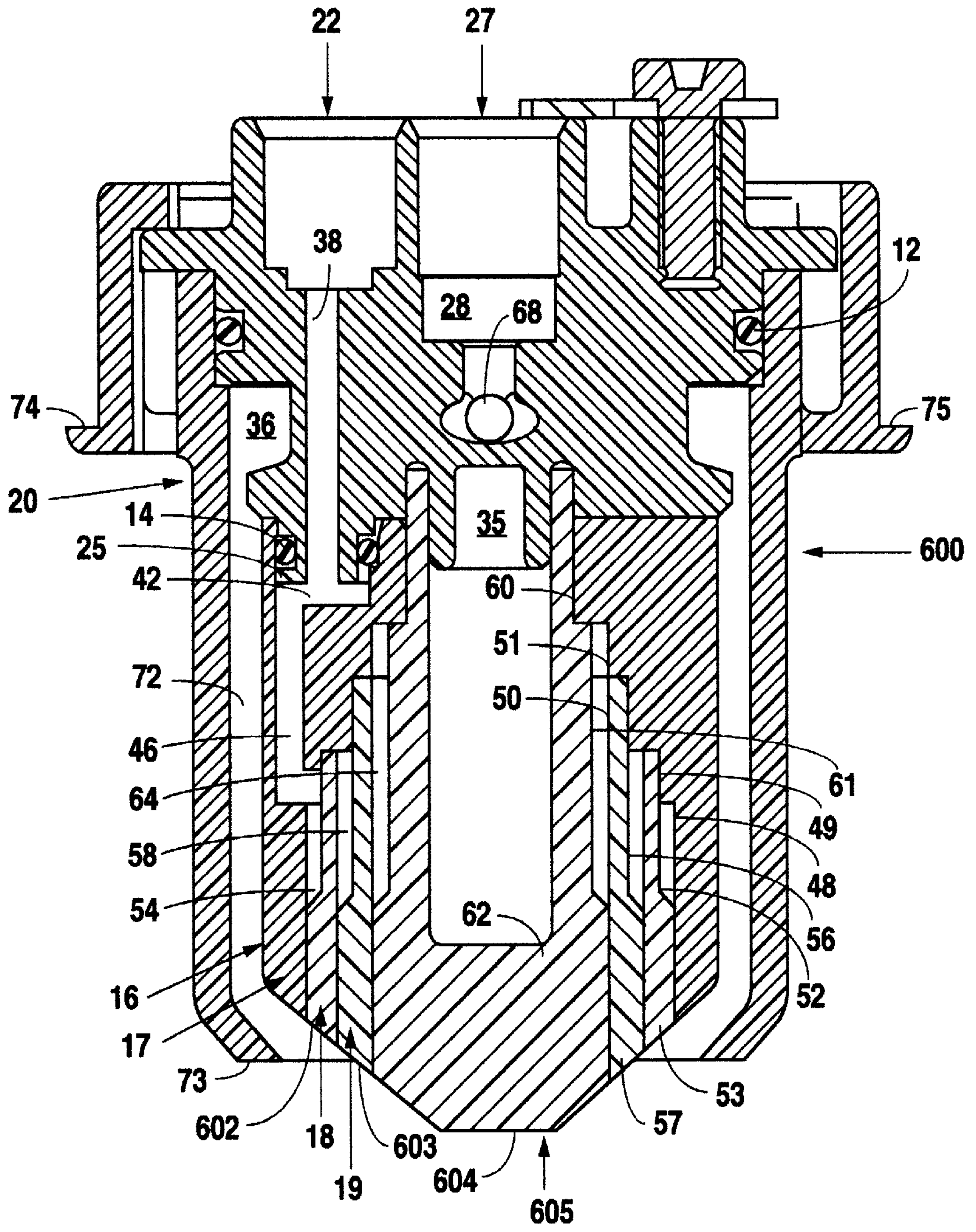
FIG. 17 is a cross-sectional view illustrating a multiple flavor beverage dispensing air-mix nozzle according to a seventh embodiment.

As illustrated in FIG. 17, a seventh embodiment of the beverage dispensing nozzle 600 is virtually identical in configuration and operation to the first embodiment of the beverage dispensing nozzle 10. Consequently, components for the beverage dispensing nozzle 600 of like configuration and operation to components of the beverage dispensing nozzle 10 have been referenced with like numerals. The beverage dispensing nozzle 600 is configured and operates as the beverage dispensing nozzle 10, except, in the beverage dispensing nozzle 600, the outlet end of the first or outer annulus 17 includes a downward sloping edge 602, the outlet end of the second or intermediate annulus 18 includes a downward sloping edge 603, and the outlet end of the third or inner annulus 19 includes a truncated conical edge 604. When the first or outer annulus 17, the second or intermediate annulus 18, and the third or inner annulus 19 are secured within the inner housing 16, the downward sloping edges 602 and 603 and the truncated conical edge 604 define a truncated conical beverage syrup nozzle outlet 605 that aids in preventing beverage syrup carryover because the truncated conical shape permits dispensed beverage syrup to flow to the lower portion of the beverage syrup nozzle outlet 605 where it is rinsed off by the flow of the dispensed mixing fluid. Furthermore, the flattened portion 606 of the truncated conical beverage syrup nozzle outlet 605 creates a low pressure region that prevents the formation of a beverage syrup bubble as well as aids in the washing of the outlet by the mixing fluid.

Figure 18:
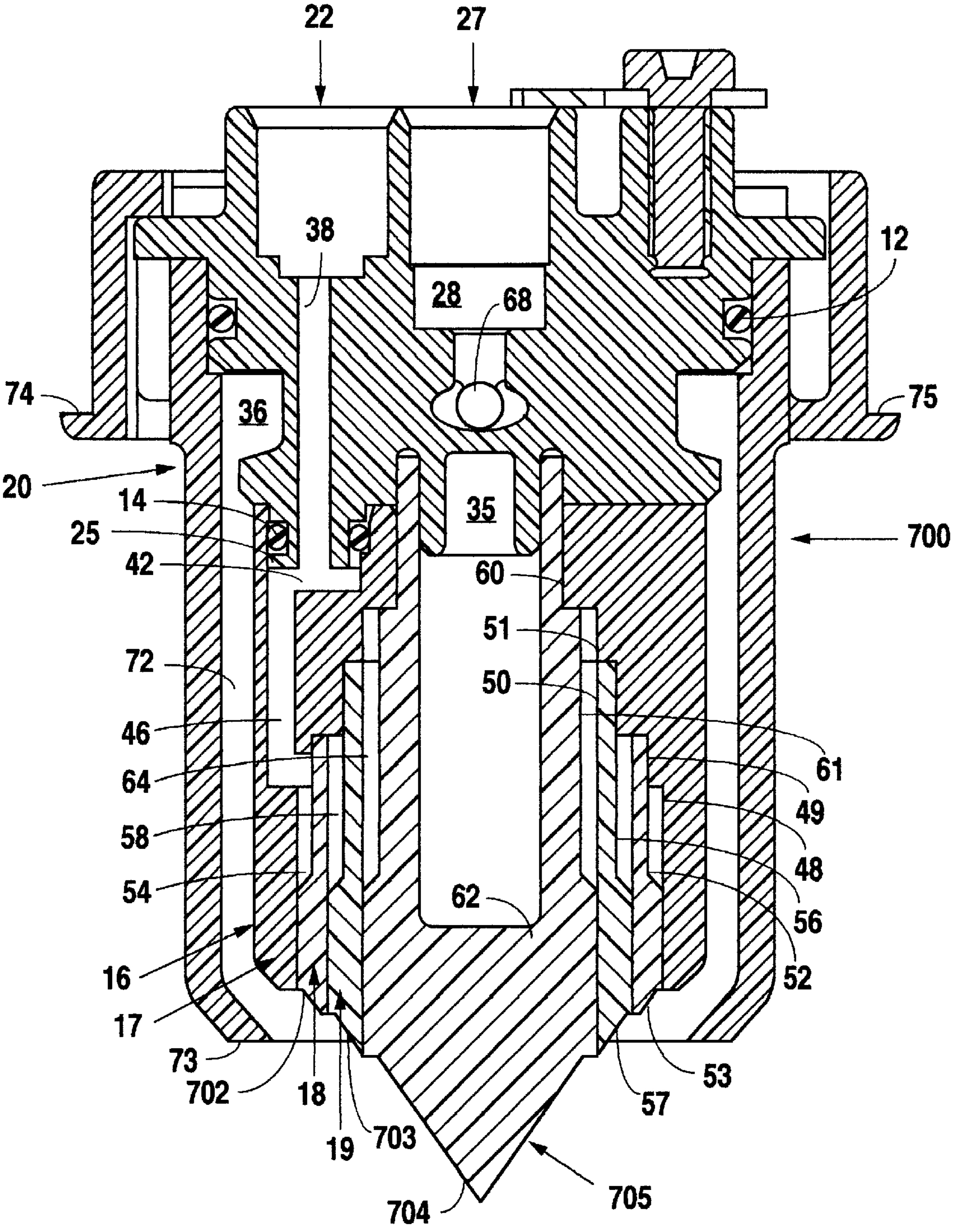
FIG. 18 is a cross-sectional view illustrating a multiple flavor beverage dispensing air-mix nozzle according to a eighth embodiment.

As illustrated in FIG. 18, an eighth embodiment of the beverage dispensing nozzle 700 is virtually identical in configuration and operation to the first embodiment of the beverage dispensing nozzle 10. Consequently, components for the beverage dispensing nozzle 700 of like configuration and operation to components of the beverage dispensing nozzle 10 have been referenced with like numerals. The beverage dispensing nozzle 700 is configured and operates as the beverage dispensing nozzle 10, except, in the beverage dispensing nozzle 700, the outlet end of the first or outer annulus 17 includes a downward cascading edge 702, the outlet end of the second or intermediate annulus 18 includes a downward cascading edge 703, and the outlet end of the third or inner annulus 19 includes a cascading conical edge 704. When the first or outer annulus 17, the second or intermediate annulus 18, and the third or inner annulus 19 are secured within the inner housing 16, the downward cascading edges 702 and 703 and the cascading conical edge 704 define a cascading conical beverage syrup nozzle outlet 705 that aids in preventing beverage syrup carryover because the cascading conical shape permits dispensed beverage syrup to flow to the lower portion of the beverage syrup nozzle outlet 705 where it is rinsed off by the flow of the dispensed mixing fluid. Furthermore, the downward cascading edges 702 and 703 and the cascading conical edge 704 create crevices that function as collection points for excess beverage syrup so that, upon subsequent dispenses, the dispensed beverage syrup flows over the collected beverage syrup and does not mix, thereby eliminating beverage syrup carryover.

Figure 19:
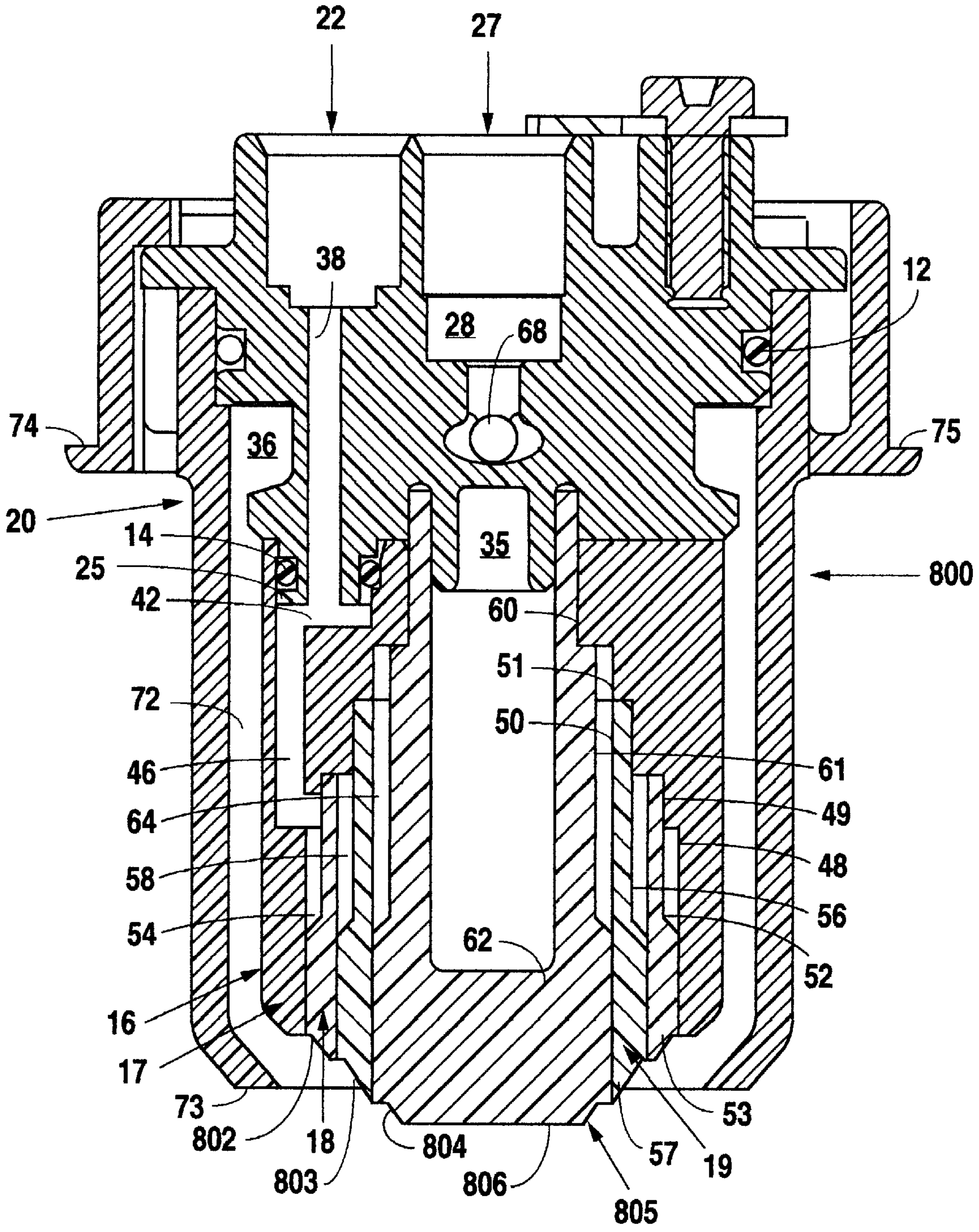
FIG. 19 is a cross-sectional view illustrating a multiple flavor beverage dispensing air-mix nozzle according to a ninth embodiment.

As illustrated in FIG. 19, a ninth embodiment of the beverage dispensing nozzle 800 is virtually identical in configuration and operation to the first embodiment of the beverage dispensing nozzle 10. Consequently, components for the beverage dispensing nozzle 800 of like configuration and operation to components of the beverage dispensing nozzle 10 have been referenced with like numerals. The beverage dispensing nozzle 800 is configured and operates as the beverage dispensing nozzle 10, except, in the beverage dispensing nozzle 800, the outlet end of the first or outer annulus 17 includes a downward cascading edge 802, the outlet end of the second or intermediate annulus 18 includes a downward cascading edge 803, and the outlet end of the third or inner annulus 19 includes a cascading truncated conical edge 804. When the first or outer annulus 17, the second or intermediate annulus 18, and the third or inner annulus 19 are secured within the inner housing 16, the downward cascading edges 802 and 803 and the cascading truncated conical edge 804 define a cascading truncated conical beverage syrup nozzle outlet 805 that aids in preventing beverage syrup carryover because the cascading truncated conical shape permits dispensed beverage syrup to flow to the lower portion of the beverage syrup nozzle outlet 805 where it is rinsed off by the flow of the dispensed mixing fluid. Furthermore, the downward cascading edges 802 and 803 and the cascading conical edge 804 create crevices that function as collection points for excess beverage syrup so that, upon subsequent dispenses, the dispensed beverage syrup flows over the collected beverage syrup and does not mix, thereby eliminating beverage syrup carryover. In addition, the flattened portion 806 of the cascading truncated conical beverage syrup nozzle outlet 805 creates a low pressure region that prevents the formation of a beverage syrup bubble as well as aids in the washing of the outlet by the mixing fluid.

Figure 20:
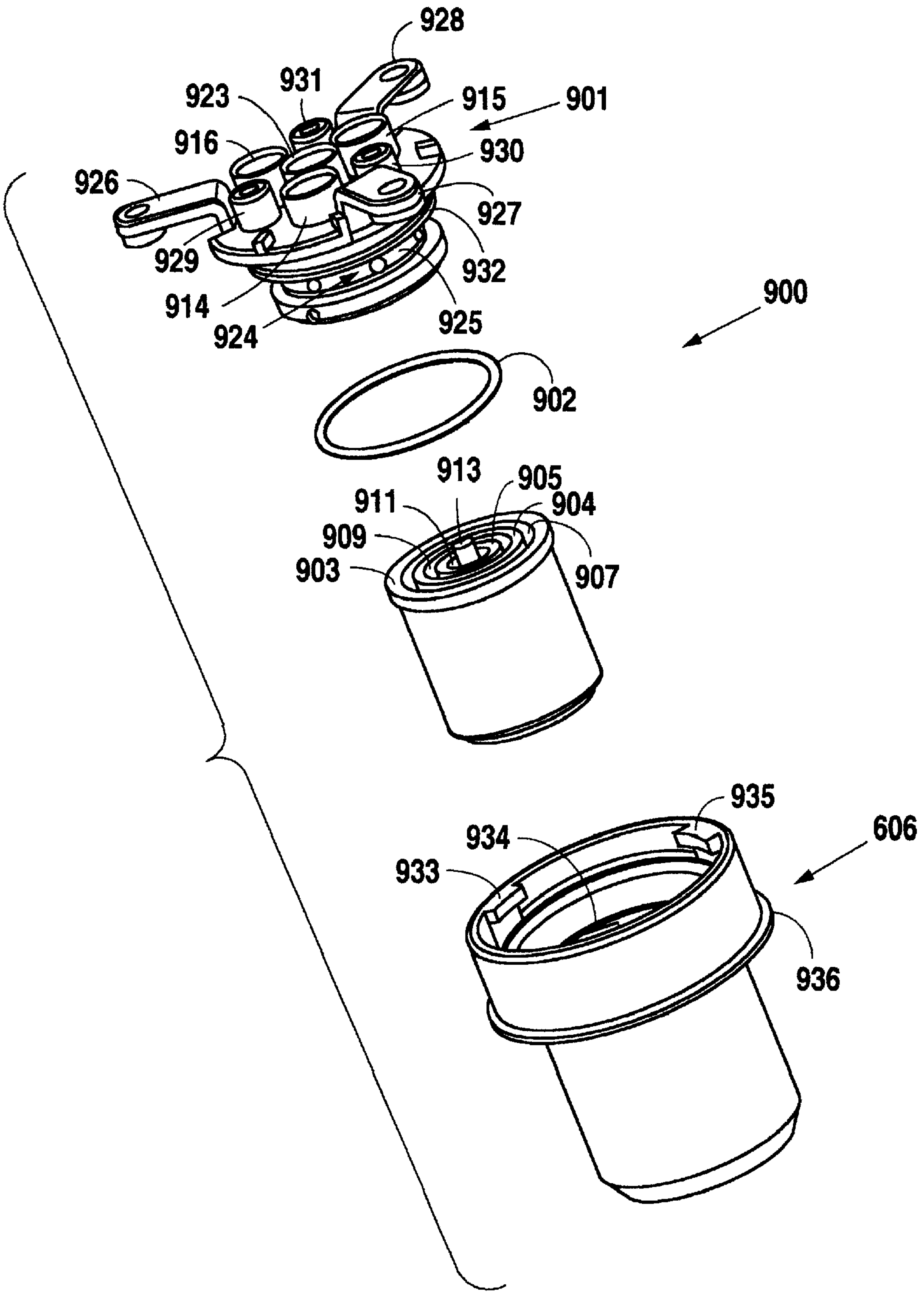
FIG. 20 is perspective view illustrating a multiple flavor beverage dispensing air-mix nozzle according to a tenth embodiment.
Figure 21:
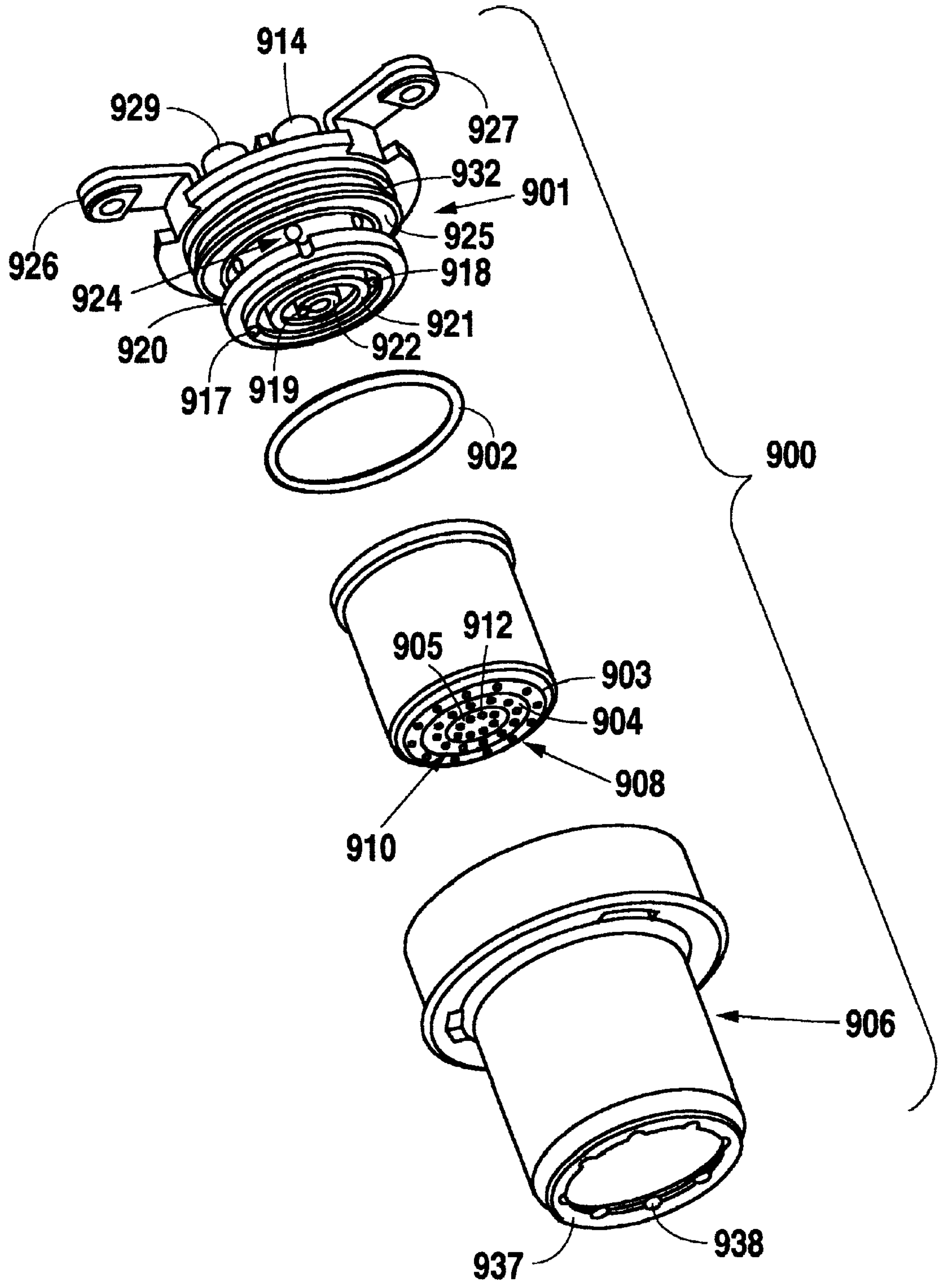
FIG. 21 is perspective view illustrating the multiple flavor beverage dispensing air-mix nozzle according to the tenth embodiment.

As illustrated in FIGS. 20 and 21, a beverage dispensing nozzle 900 includes a cap member 901, an o-ring 902, a first or outer annulus 903, a second or intermediate annulus 904, a third or inner annulus 905, and an outer housing 906. The first or outer annulus 903 is a hollow cylinder defining a chamber for receiving the second or intermediate annulus 904 therein. The first or outer annulus 903 includes discharge channels 908 communicating completely therethrough. The first or outer annulus 903 further includes a groove 907 that along with a portion of the outer surface of the second or intermediate annulus 904 forms a cavity for distributing beverage syrup about the upper portion of the first or outer annulus 903. The groove 907 communicates beverage syrup to the discharge channels 908, which discharge the beverage syrup from the first or outer annulus 903 in an annular flow that facilitates uniform distribution of the beverage syrup as it exits from the beverage dispensing nozzle 900, thereby providing a maximum surface area for contact with mixing fluid also exiting from the beverage dispensing nozzle 900.

The second or intermediate annulus 904 is a hollow cylinder defining a chamber for receiving the third or inner annulus 905 therein. The second or intermediate annulus 904 fits within the first or outer annulus 903 such that the exterior surface of the second or intermediate annulus 904 abuts the interior surface of the first or outer annulus 903. The second or intermediate annulus 904 press fits within the first or outer annulus 903 or, alternatively, an adhesive may be used to secure the second or intermediate annulus 904 within the first or outer annulus 903. The second or intermediate annulus 904 includes discharge channels 910 communicating completely therethrough. The second or intermediate annulus 904 further includes a groove 909 that along with a portion of the outer surface of the third or inner annulus 905 forms a cavity for distributing beverage syrup about the upper portion of the second or intermediate annulus 904. The groove 909 communicates beverage syrup to the discharge channels 910, which discharge the beverage syrup from the second or intermediate annulus 904 in an annular flow that facilitates uniform distribution of the beverage syrup as it exits from the beverage dispensing nozzle 900, thereby providing a maximum surface area for contact with mixing fluid also exiting from the beverage dispensing nozzle 900.

The third or inner annulus 905 is a solid cylinder including discharge channels 912 communicating completely therethrough. The third or inner annulus 905 fits within the second or intermediate annulus 904 such that the exterior surface of the third or inner annulus 905 abuts the interior surface of the second or intermediate annulus 904. The third or inner annulus 905 press fits within the second or intermediate annulus 904 or, alternatively, an adhesive may be used to secure the third or inner annulus 905 within the second or intermediate annulus 904. The third or inner annulus 905 includes a securing member 913, which aids in securing the third or inner annulus 905 to the cap member 901. The third or inner annulus 905 further includes a groove 911 that defines a cavity for distributing beverage syrup about the upper portion of the third or inner annulus 905. The groove 911 communicates beverage syrup to the discharge channels 912, which discharge the beverage syrup from the third or inner annulus 905 in an annular flow that facilitates uniform distribution of the beverage syrup as it exits from the beverage dispensing nozzle 900, thereby providing a maximum surface area for contact with mixing fluid also exiting from the beverage dispensing nozzle 900. Although this tenth embodiment discloses annuluses 903–905, one of ordinary skill in the art will recognize that any number of annuluses may be utilized, that a single unitary nozzle body including the desired number of discharge channels could be constructed, and that alternative shapes, such as elliptical or polygonal, may be utilized.

The cap member 901 includes beverage syrup inlet ports 914–916 that communicate with a respective beverage syrup outlet port 917–919 via a respective connecting conduit through the cap member 901. The cap member 901 includes raised portions 920–922 to aid in the securing of the first or outer annulus 903, the second or intermediate annulus 904, and the third or inner annulus 905 to the cap member 901. Each raised portion 920–922 snap fits within a respective groove 907, 909, and 911 to secure the first or outer annulus 903, the second or intermediate annulus 904, and the third or inner annulus 905 to the cap member 901. Furthermore, the securing member 913 snap fits within raised ring 922 to aid in the securing of the third or inner annulus 905 to the cap member 901. Although each raised portion 920–922 snap fits within a respective groove 907, 909, and 911, the grooves 907, 909, and 911 include sufficient depth to maintain a cavity for receiving beverage syrup from a respective beverage syrup outlet port 917–919 and delivering the beverage syrup to a respective discharge channel 908, 910, and 912. With the first or outer annulus 903 secured to the cap member 901, a beverage syrup path involving the beverage syrup inlet port 914; a respective connecting conduit; the beverage syrup outlet port 917; a respective cavity defined by the groove 907; and the discharge channels 908 is created. A beverage syrup path involving the beverage syrup inlet port 915; a respective connecting conduit; the beverage syrup outlet port 918; a respective cavity defined by the groove 909; and the discharge channels 910; and one involving the beverage syrup inlet port 916; a respective connecting conduit; the beverage syrup outlet port 919; a respective cavity defined by the groove 911; and the discharge channels 912; are also created.

The cap member 901 includes a mixing fluid inlet port 923 that communicates with mixing fluid outlet channels 924 via a connecting conduit through the cap member 901. The mixing fluid outlet channels 924 in this tenth embodiment are uniformly spaced within the cap member 901 and communicate with an annular cavity 925 defined by a portion of the cap member 901 to deliver mixing fluid along the entire circumference of the annular cavity 925. In this tenth embodiment, the preferred mixing fluid is carbonated water, which forms a carbonated beverage drink when combined with a beverage syrup. Nevertheless, one of ordinary skill in the art will recognize that other mixing fluids, such as plain water may be used. Furthermore, although the preferred embodiment discloses the formation of a beverage from a beverage syrup and a mixing fluid, such as carbonated or plain water, one of ordinary skill in the art will recognize that a mixing fluid, such as carbonated or plain water, may be dispensed individually from a beverage path as described above instead of a beverage syrup.

The cap member 901 includes dog ears 926–928 that permit the connection of the cap member 901 to a standard dispensing valve using suitable and well known means. Each of the beverage syrup inlet ports 914–916 receives a beverage syrup conduit to supply the beverage dispensing nozzle 900 with a beverage syrup. Similarly, the mixing fluid inlet port 923 receives a mixing fluid conduit to supply the beverage dispensing nozzle 900 with a mixing fluid. A fastening clip secured to each of bosses 929–931, utilizing a screw or other suitable means, maintains the beverage syrup conduits coupled with a respective beverage syrup inlet port 914–916 and the mixing fluid conduit coupled with the mixing fluid inlet port 923. The cap member 901 includes a groove 932 for receiving the o-ring 902 therein.

The outer housing 906 fits over the cap member 901, including the o-ring 902 which provides a fluid seal and assists in the securing of the outer housing 906 to the cap member 901, and is held in place via tabs 933–935. The outer housing 906 includes flange 936 that aids in mounting the outer housing 906 to a dispensing valve in well-known manner. The outer housing 906 further includes an inwardly extending lip portion 937 and slots 938 at its exit end. The interior wall of the outer housing 906 in combination with the portion of the cap member 901 defining the annular cavity 36 and the exterior wall of the first or inner annulus 903 define an annular channel. With the outer housing 906 secured to the cap member 901, a mixing fluid path involving the mixing fluid inlet port 923, the connecting conduit, the mixing fluid outlet channels 924, and the annular channel is created. Although the preferred embodiment contemplates the dispensing of a mixing fluid, such as carbonated or plain water, in combination with a beverage syrup, one of ordinary skill in the art will recognize that the mixing fluid may be dispensed separately to provide the mixing fluid by itself.

In operation, mixing fluid enters the beverage dispensing nozzle 900 through the mixing fluid inlet port 923 and travels through the connecting conduit to the mixing fluid outlet channels 924 for delivery into the annular cavity 925. The annular cavity 925 receives a large volume of mixing fluid to insure the annular channel remains full for uniform flow around the annular channel as the mixing fluid flows downwardly through the annular channel to the discharge end of the annular channel. In the tenth embodiment, the discharge end of the annular channel may be partially closed to increase the momentum of the mixing fluid exiting the annular channel to maintain a uniform distribution of mixing fluid exiting around the entire circumference of the annular channel. The inwardly extending lip portion 937 of the outer housing 906 directs the mixing fluid inwardly toward a beverage syrup stream exiting from one of the first or outer annulus 903, the second or intermediate annulus 904, and the third or inner annulus 905. The inward directing of the mixing fluid provides for intimate mixing as well as a means for washing the discharge end of the annular channel to prevent syrup carryover.

Furthermore, the slots 938 aid in the prevention of syrup carryover by preventing fluid bridging between the first or outer annulus 903 and the outer housing 906, which could result in beverage syrup being drawn from one of the first or outer annulus 903, the second or intermediate annulus 904, and the third or inner annulus 905. The slots 938 interrupt the surface of the outer housing 906 so that, upon the end of a dispense, any remaining mixing fluid accumulates in a drop on the surface between each individual slot 938. The drop falls from the outer housing 906 due to gravity, thereby preventing fluid bridging between the first or outer annulus 903 and the outer housing 906.

The beverage syrup inlet ports 914–916 each receive a different flavor of beverage syrup, which is delivered through a conduit by a beverage syrup source (not shown). Each beverage syrup travels through its particular flow path for discharge from the beverage dispensing nozzle 900 as previously described. Illustratively, a beverage syrup delivered to the beverage syrup inlet port 914 flows through the connecting conduit, the beverage syrup outlet port 917, the cavity defined by the groove 907, and the discharge channels 908 prior to discharge from the beverage dispensing nozzle 900. The discharge channels 908, 910, and 912 provide beverage syrup around each of a respective first or outer, second or intermediate, and third or inner annulus for discharge from the beverage dispensing nozzle 900. The discharge channels 908, 910, and 912 insure uniform distribution of the beverage syrup as it exits from the beverage dispensing nozzle 900, thus insuring a maximum surface area for contact with the mixing fluid exiting from the annular channel. Although only one beverage syrup is typically dispensed at a time, it should be understood that more than one beverage syrup may be discharged from the beverage dispensing nozzle 900 at a time to provide a mix of flavors.

An important feature of the beverage dispensing nozzle 900 is the annular discharge of a beverage syrup, whereby the annularly discharged mixing fluid contacts the beverage syrup in mid-air below the dispensing nozzle 900. The annular discharge shape of the beverage syrup and the mixing fluid significantly increases the contact surface area between the two streams, resulting in more effective mixing. Furthermore, the mixture of the beverage syrup and the mixing fluid outside the beverage dispensing nozzle 900 eliminates the sanitary considerations that occur with a mixing chamber interior to the nozzle; namely, the unsanitary build up of bacteria on the interior of the mixing chamber, which is exacerbated due to the stickiness of the beverage syrup. Although three separate beverage syrup sources with three annuluses have been described, one of ordinary skill in the art will recognize that any number of beverage syrup sources and annuluses could be provided, including a single beverage syrup source and annulus. In addition, the single stream of mixing fluid exiting from the annular channel may be separated into two or more streams.

Although the present invention has been described in terms of the foregoing embodiment, such description has been for exemplary purposes only and, as will be apparent to one of ordinary skill in the art, many alternatives, equivalents, and variations of varying degrees will fall within the scope of the present invention. That scope, accordingly, is not to be limited in any respect by the foregoing description; rather, it is defined only by the claims that follow.

I claim:

1. A beverage dispensing nozzle, comprising:

a cap member comprising a first beverage syrup inlet port coupled to a first beverage syrup source and a mixing fluid inlet port coupled to a mixing fluid source;

a first annulus coupled with the cap member, the first annulus including discharge channels, wherein the first beverage syrup inlet port communicates beverage syrup to the discharge channels for discharge from the beverage dispensing nozzle substantially undiluted with mixing fluid; and an outer housing coupled to the cap member, the outer housing and the first annulus defining a mixing fluid channel, wherein the mixing fluid inlet port communicates mixing fluid to the mixing fluid channel for discharge from the beverage dispensing nozzle for contact with exiting beverage syrup to mix therewith outside the beverage dispensing nozzle.

2. The beverage dispensing nozzle according to claim 1, wherein the first annulus includes a groove therein that receives beverage syrup from the first beverage syrup inlet port and delivers the beverage syrup to the discharge channels.

3. The beverage dispensing nozzle according to claim 2, wherein the cap member comprises a first beverage syrup outlet port connected with the first beverage syrup inlet port and a raised portion, wherein the raised portion fits within the groove of the first annulus to couple the first annulus to the cap member and to communicate beverage syrup to the first annulus.

4. The beverage dispensing nozzle according to claim 1, wherein the cap member comprises a plurality of mixing fluid outlet channels connected to the mixing fluid inlet port and communicating with the mixing fluid channel for circumferentially delivering mixing fluid into the mixing fluid channel.

5. The beverage dispensing nozzle according to claim 1, wherein the discharge channels of the first annulus insure a uniform distribution of the beverage syrup in an annular flow pattern.

6. The beverage dispensing nozzle according to claim 1, wherein the mixing fluid channel discharges the mixing fluid from the beverage dispensing nozzle in an annular flow pattern.

7. The beverage dispensing nozzle according to claim 1, wherein the outer housing includes an inwardly extending lip portion that directs inward the flow of mixing fluid exiting the beverage dispensing nozzle.

8. The beverage dispensing nozzle according to claim 1, wherein the outer housing includes slots.

9. The beverage dispensing nozzle according to claim 1, wherein the cap member further comprises a second beverage syrup inlet port coupled to a second beverage syrup source.

10. The beverage dispensing nozzle according to claim 9, further comprising a second annulus disposed within the first annulus and coupled with the cap member, the second annulus including discharge channels, wherein the second beverage syrup inlet port communicates beverage syrup to the discharge channels for discharge from the beverage dispensing nozzle substantially undiluted with mixing fluid.

11. The beverage dispensing nozzle according to claim 10, wherein the second annulus includes a groove therein that receives beverage syrup from the second beverage syrup inlet port and delivers the beverage syrup to the discharge channels.

12. The beverage dispensing nozzle according to claim 11, wherein the cap member further comprises a second beverage syrup outlet port connected with the second beverage syrup inlet port and a raised portion, wherein the raised portion fits within the groove of the second annulus to couple the second annulus to the cap member and to communicate beverage syrup to the second annulus.

13. The beverage dispensing nozzle according to claim 10, wherein the discharge channels of the second annulus insure a uniform distribution of the beverage syrup in an annular flow pattern.

14. The beverage dispensing nozzle according to claim 10, wherein the cap member further comprises a third beverage syrup inlet port coupled to a third beverage syrup source.

15. The beverage dispensing nozzle according to claim 14, further comprising a third annulus disposed within the second annulus and coupled with the cap member, the third annulus including discharge channels, wherein the third beverage syrup inlet port communicates beverage syrup to the discharge channels for discharge from the beverage dispensing nozzle substantially undiluted with mixing fluid.

16. The beverage dispensing nozzle according to claim 15, wherein the third annulus includes a groove therein that receives beverage syrup from the second beverage syrup inlet port and delivers the beverage syrup to the discharge channels.

17. The beverage dispensing nozzle according to claim 16, wherein the cap member either comprises a third beverage syrup outlet port connected with the third beverage syrup inlet port and a raised portion, wherein the raised portion fits within the groove of the third annulus to couple the third annulus to the cap member and to communicate beverage syrup to the third annulus.

18. The beverage dispensing nozzle according to claim 15, wherein the discharge channels of the third annulus insure a uniform distribution of the beverage syrup in an annular flow pattern.

19. A method of forming a beverage drink utilizing a beverage dispensing nozzle, comprising the steps of:

delivering a beverage syrup to a first beverage syrup inlet port of a cap member;

delivering a mixing fluid to a mixing fluid inlet port of the cap member;

delivering the beverage syrup from the first beverage syrup inlet port to discharge channels of a first annulus coupled with the cap member;

discharging the beverage syrup from the discharge channels substantially undiluted with mixing fluid;

delivering the mixing fluid from the mixing fluid inlet port to a mixing fluid channel defined by an outer housing coupled to the cap member and the first annulus; and discharging the mixing fluid from the mixing fluid channel for contact with exiting beverage syrup to mix therewith outside the beverage dispensing nozzle.

20. The method of forming a beverage drink utilizing a beverage dispensing nozzle according to claim 19, further comprising the steps of:

delivering a beverage syrup to a second beverage syrup inlet port of the cap member;

delivering the beverage syrup from the second beverage syrup inlet port to discharge channels of a second annulus disposed within the first annulus and coupled with the cap member; and discharging the beverage syrup from the discharge channels substantially undiluted with mixing fluid.

21. The method of forming a beverage drink utilizing a beverage dispensing nozzle according to claim 20, further comprising the steps of:

delivering a beverage syrup to a third beverage syrup inlet port of the cap member;

delivering the beverage syrup from the third beverage syrup inlet port to discharge channels of a third annulus disposed within the second annulus and coupled with the cap member; and discharging the beverage syrup from the discharge channels substantially undiluted with mixing fluid.

22. A beverage dispensing nozzle, comprising:

a cap member comprising a first beverage syrup inlet port coupled to a first beverage syrup source, a second beverage syrup inlet port coupled to a second beverage syrup source, and a mixing fluid inlet port coupled to a mixing fluid source;

a first annulus coupled with the cap member, the first annulus including discharge channels, wherein the first beverage syrup inlet port communicates beverage syrup to the discharge channels for discharge from the beverage dispensing nozzle;

a second annulus disposed within the first annulus and coupled with the cap member, the second annulus including discharge channels, wherein the second beverage syrup inlet port communicates beverage syrup to the discharge channels for discharge from the beverage dispensing nozzle; and an outer housing coupled to the cap member, the outer housing and the first annulus defining a mixing fluid channel, wherein the mixing fluid inlet port communicates mixing fluid to the mixing fluid channel for discharge from the beverage dispensing nozzle and mixing with exiting beverage syrup.

23. The beverage dispensing nozzle according to claim 22, wherein the first annulus includes a groove therein that receives beverage syrup from the first beverage syrup inlet port and delivers the beverage syrup to the discharge channels.

24. The beverage dispensing nozzle according to claim 23, wherein the cap member comprises a first beverage syrup outlet port connected with the first beverage syrup inlet port and a raised portion, wherein the raised portion fits within the groove of the first annulus to couple the first annulus to the cap member and to communicate beverage syrup to the first annulus.

25. The beverage dispensing nozzle according to claim 22, wherein the cap member comprises a plurality of mixing fluid outlet channels connected to the mixing fluid inlet port and communicating with the mixing fluid channel for circumferentially delivering mixing fluid into the mixing fluid channel.

26. The beverage dispensing nozzle according to claim 22, wherein the discharge channels of the first annulus insure a uniform distribution of the beverage syrup in an annular flow pattern.

27. The beverage dispensing nozzle according to claim 22, wherein the mixing fluid channel discharges the mixing fluid from the beverage dispensing nozzle in an annular flow pattern.

28. The beverage dispensing nozzle according to claim 22, wherein the outer housing includes an inwardly extending lip portion for directing inward the flow of mixing fluid exiting the beverage dispensing nozzle.

29. The beverage dispensing nozzle according to claim 22, wherein the outer housing includes a slot.

30. The beverage dispensing nozzle according to claim 22, wherein the second annulus includes a groove therein that receives beverage syrup from the second beverage syrup inlet port and delivers the beverage syrup to the discharge channels.

31. The beverage dispensing nozzle according to claim 30, wherein the cap member further comprises a second beverage syrup outlet port connected with the second beverage syrup inlet port and a raised portion, wherein the raised portion fits within the groove of the second annulus to couple the second annulus to the cap member and to communicate beverage syrup to the second annulus.

32. The beverage dispensing nozzle according to claim 22, wherein the discharge channels of the second annulus insure a uniform distribution of the beverage syrup in an annular flow pattern.

33. The beverage dispensing nozzle according to claim 22, wherein the cap member further comprises a third beverage syrup inlet port coupled to a third beverage syrup source.

34. The beverage dispensing nozzle according to claim 33, further comprising a third annulus disposed within the second annulus and coupled with the cap member, the third annulus including discharge channels, wherein the third beverage syrup inlet port communicates beverage syrup to the discharge channels for discharge from the beverage dispensing nozzle substantially undiluted with mixing fluid.

35. The beverage dispensing nozzle according to claim 34, wherein the third annulus includes a groove therein that receives beverage syrup from the second beverage syrup inlet port and delivers the beverage syrup to the discharge channels.

36. The beverage dispensing nozzle according to claim 35, wherein the cap member further comprises a third beverage syrup outlet port connected with the third beverage syrup inlet port and a raised portion, wherein the raised portion fits within the groove of the third annulus to couple the third annulus to the cap member and to communicate beverage syrup to the third annulus.

37. The beverage dispensing nozzle according to claim 34, wherein the discharge channels of the third annulus insure a uniform distribution of the beverage syrup in an annular flow pattern.

38. A method of forming a beverage drink utilizing a beverage dispensing nozzle, comprising the steps of:

delivering a beverage syrup to a first beverage syrup inlet port of a cap member;

delivering a beverage syrup to a second beverage syrup inlet port of the cap member;

delivering a mixing fluid to a mixing fluid inlet port of the cap member;

delivering the beverage syrup from the first beverage syrup inlet port to discharge channels of a first annulus coupled with the cap member;

discharging the beverage syrup from the discharge channels substantially undiluted with mixing fluid;

delivering the beverage syrup from the second beverage syrup inlet port to discharge channels a second annulus disposed within the first annulus and coupled with the cap member; and discharging the beverage syrup from the discharge channels substantially undiluted with mixing fluid, delivering the mixing fluid from the mixing fluid inlet port to a mixing fluid channel defined by an outer housing coupled to the cap member and the first annulus; and discharging the mixing fluid from the mixing fluid channel for contact with exiting beverage syrup to mix therewith outside the beverage dispensing nozzle.

39. The method of forming a beverage drink utilizing a beverage dispensing nozzle according to claim 38, further comprising the steps of:

delivering a beverage syrup to a third beverage syrup inlet port of the cap member;

delivering the beverage syrup from the third beverage syrup inlet port to discharge channels of a third annulus disposed within the second annulus and coupled with the cap member; and discharging the beverage syrup from the discharge channels substantially undiluted with mixing fluid.

* * * * *